Oct. 12, 1965  W. COMLEY, JR., ETAL  3,211,901
NONLINEAR FUNCTION GENERATING MEANS
Filed Aug. 31, 1959  27 Sheets-Sheet 1

INVENTORS
LADIS D. KOVACH
WILLIAM COMLEY JR
BY
ATTORNEYS.

INVENTORS
LADIS D KOVACH
WILLIAM COMLEY JR
BY
ATTORNEYS

Oct. 12, 1965 W. COMLEY, JR., ETAL 3,211,901
NONLINEAR FUNCTION GENERATING MEANS
Filed Aug. 31, 1959 27 Sheets-Sheet 3

INVENTORS
LADIS D KOVACH
WILLIAM COMLEY JR
BY
ATTORNEYS.

Oct. 12, 1965 W. COMLEY, JR., ETAL 3,211,901
NONLINEAR FUNCTION GENERATING MEANS
Filed Aug. 31, 1959 27 Sheets-Sheet 8

INVENTORS
LADIS D. KOVACH
WILLIAM COMLEY JR.
BY
ATTORNEYS·

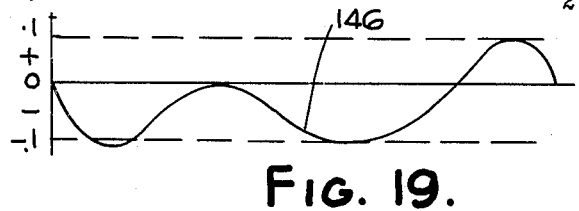
FIG. 19.
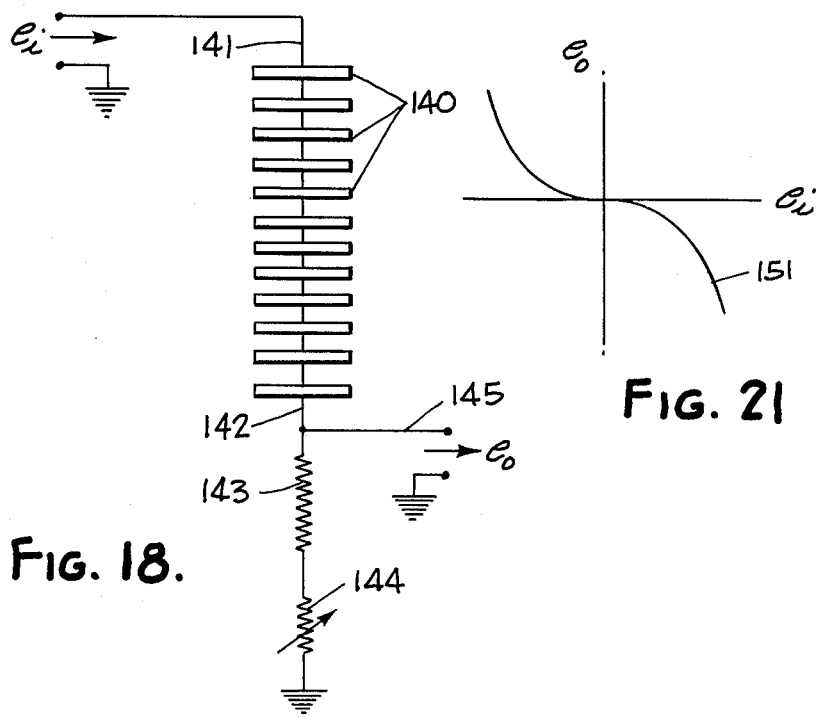
FIG. 18.
FIG. 21
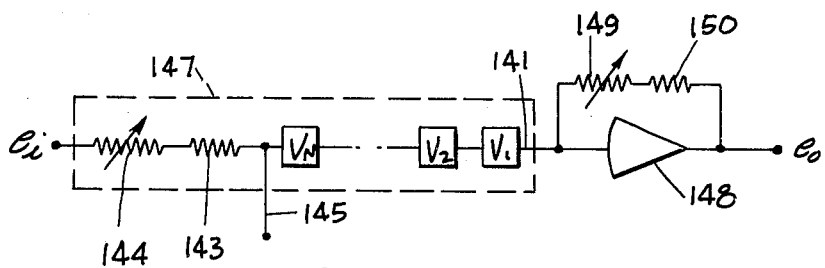
FIG. 20.

Oct. 12, 1965    W. COMLEY, JR., ETAL    3,211,901
NONLINEAR FUNCTION GENERATING MEANS
Filed Aug. 31, 1959    27 Sheets-Sheet 14

INVENTORS
LADIS D. KOVACH
WILLIAM COMLEY JR
BY
· ATTORNEYS ·

Oct. 12, 1965    W. COMLEY, JR., ETAL    3,211,901
NONLINEAR FUNCTION GENERATING MEANS
Filed Aug. 31, 1959    27 Sheets-Sheet 15

INVENTORS
LADIS D. KOVACH
WILLIAM COMLEY JR
BY
· ATTORNEYS ·

Oct. 12, 1965  W. COMLEY, JR., ETAL  3,211,901
NONLINEAR FUNCTION GENERATING MEANS
Filed Aug. 31, 1959  27 Sheets-Sheet 16

INVENTORS
LADIS D. KOVACH
WILLIAM COMLEY JR.
BY
ATTORNEYS.

Oct. 12, 1965   W. COMLEY, JR., ET AL   3,211,901
NONLINEAR FUNCTION GENERATING MEANS
Filed Aug. 31, 1959   27 Sheets-Sheet 17

INVENTORS
LADIS D. KOVACH
WILLIAM COMLEY JR
BY
·ATTORNEYS·

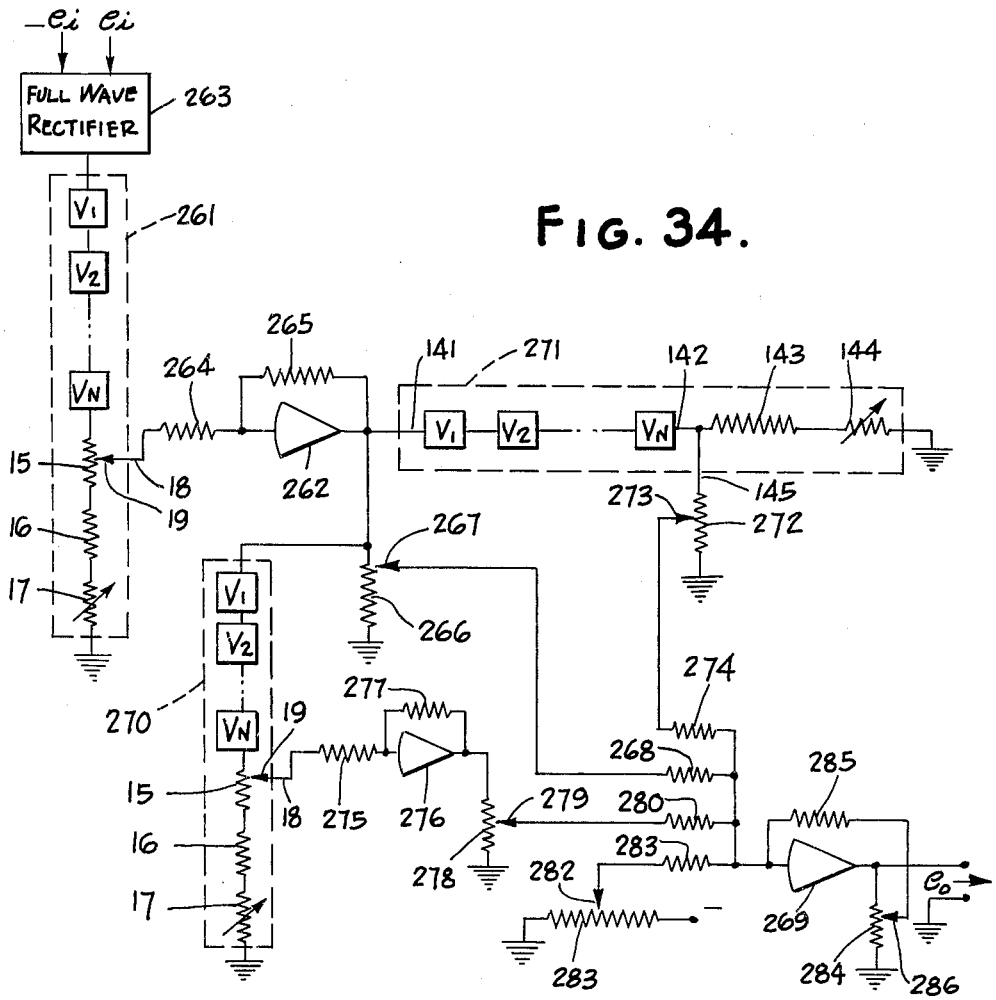
FIG. 34.
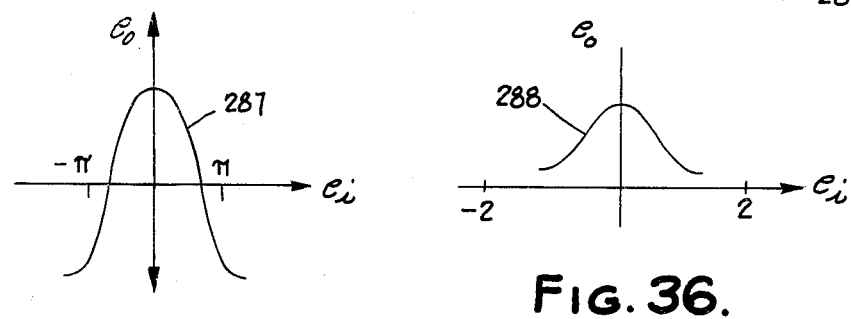
FIG. 35.
FIG. 36.

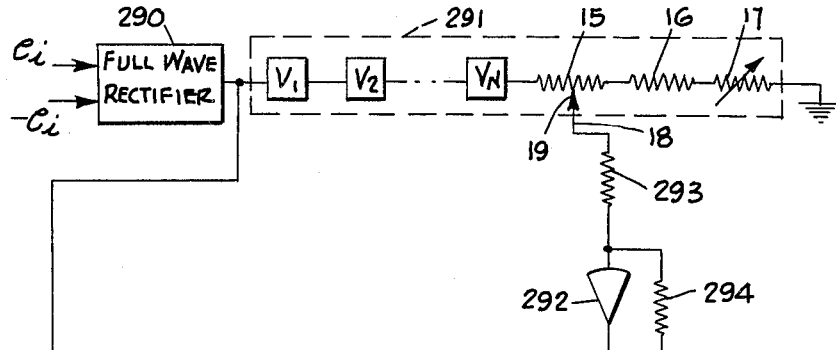
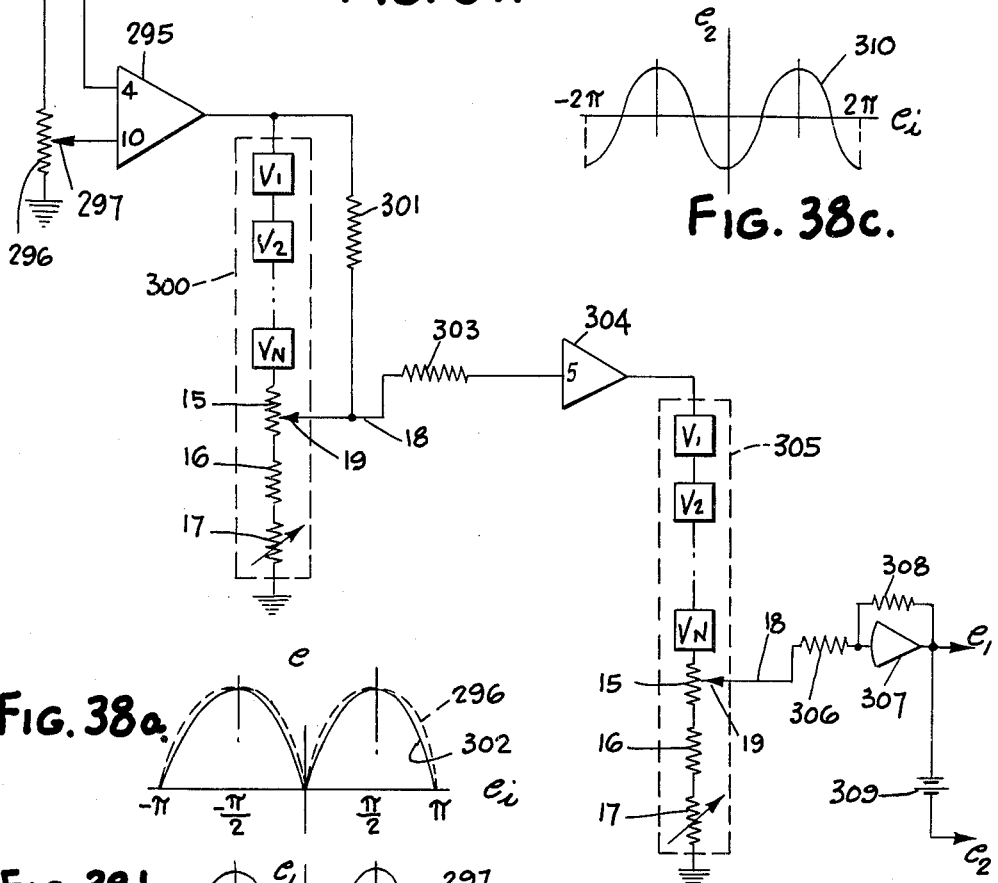
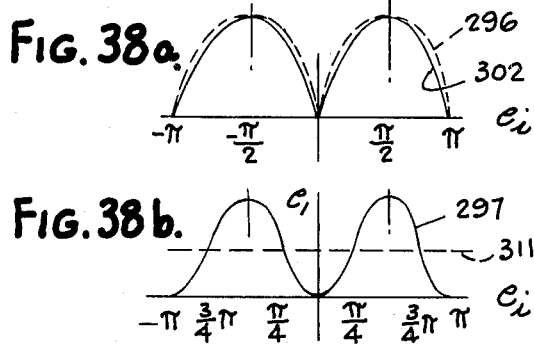

Oct. 12, 1965  W. COMLEY, JR., ETAL  3,211,901
NONLINEAR FUNCTION GENERATING MEANS
Filed Aug. 31, 1959    27 Sheets-Sheet 20

INVENTORS
LADIS D. KOVACH
WILLIAM COMLEY JR
BY
*Zulurdes Mattingly & Huntley*
· ATTORNEYS ·

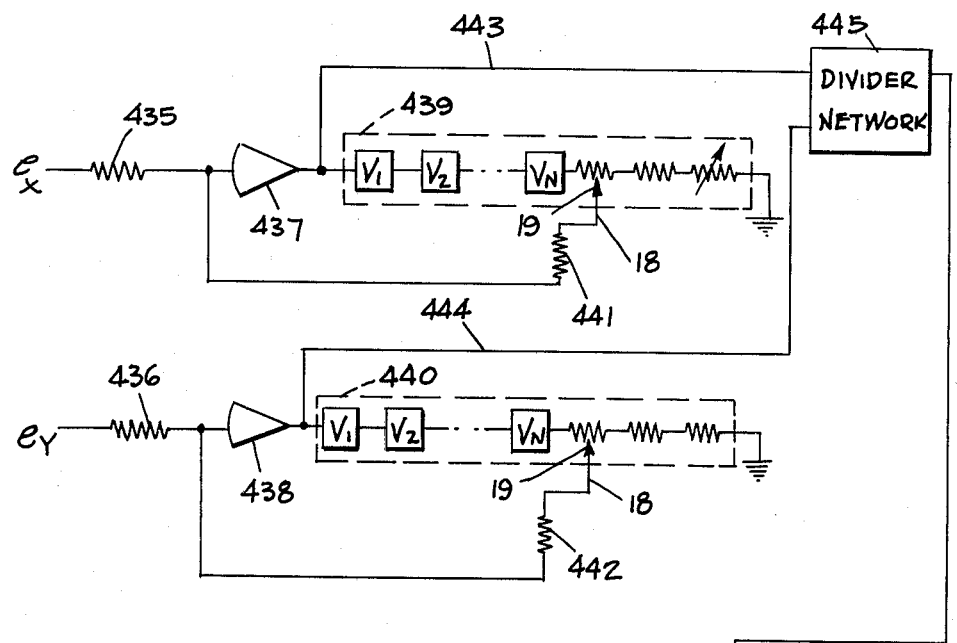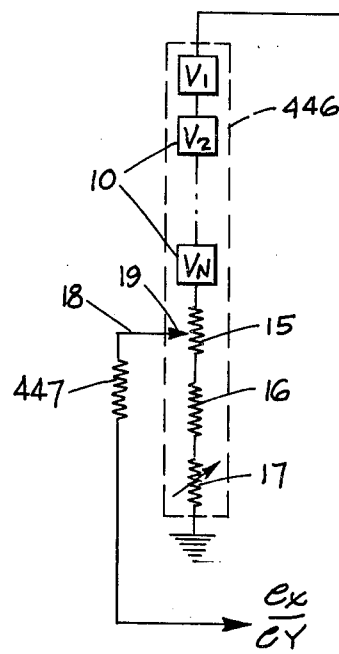
FIG. 51.

United States Patent Office 3,211,901
Patented Oct. 12, 1965

3,211,901
NONLINEAR FUNCTION GENERATING MEANS
William Comley, Jr., and Ladis D. Kovach, Los Angeles, Calif., assignors to Douglas Aircraft Company, Inc., Santa Monica, Calif.
Filed Aug. 31, 1959, Ser. No. 837,006
8 Claims. (Cl. 235—197)

This invention relates to electrical means characterized by nonlinear operation, and more particularly to unique electrical network or circuit means responsive to an arbitrary electrical characteristic to develop a nonlinear electrical characteristic.

Considerable research has heretofore been directed towards providing means for developing, analyzing, simulating and resolving nonlinear characteristics of numerous types. These efforts have been frustrated because of the non-existence of simple, reliable and versatile means to develop electrical characteristics, e.g., voltages, with which to pursue research.

Typical of nonlinear tools heretofore available is a nonlinear function generator that is capable of developing an output voltage having a predetermined nonlinear functional relation to an input voltage. One such device, for example, may be designed to develop an output voltage of parabolic waveform, corresponding to some power (e.g., the square) of an input voltage. Such a device is constructed with a plurality of circuit elements, including diodes connected in an intricate circuit arrangement, to develop linear voltage segments for creating an output voltage. The greater the number of circuit elements employed for this purpose, the greater is the number of segments. With a sufficient number of such segments, a plot of the waveform of the output voltage will appear to be a substantially smooth curve.

To develop a voltage waveform that accurately represents a predetermined nonlinear function of an input voltage requires an enormous number of circuit elements. In fact, to obtain a voltage that is accurate to within, say, one-half of one percent, i.e., 0.5%, a typical diode function generator, as for developing a voltage related as the square of an input voltage, occupies upwards to three cubic feet (3 cu. ft.) of space. Such a device is, of course, extremely expensive to make.

Accordingly, the size and cost of a number of such devices, which might be needed in carrying out research in many important areas, is prohibitive. For example, if six (6) function generators were employed to develop separate voltages of the same or different nonlinear characteristics, the total cost would be six times the thousands of dollars it costs for one generator, and the total volume occupied by these devices would be six times that of one, i.e., upwards to 18 cubic feet.

It has long been recognized that many systems could be operated more effectively in response to electrical characteristics which vary as some power of a change occurring in some portion of the system. For example, it is desired that a servo system be made to have a rapid response to an error signal resulting from a change in the position of a structure controlled thereby, to quickly stabilize the structure in the desired position. Improvement of the response may be accomplished by introducing a nonlinearity into the error signal that optimizes the response of the servo loop.

There are numerous other examples, of course, where nonlinear functions are more desirable than linear functions. One important area where this is the case is in the field of analog computers. In this area, it is often desirable to solve systems of equations containing various nonlinear functions. However, in the absence of economically practical means for generating voltages representing various mathematical terms and expressions, progress in this field is severely handicapped.

It is an object of this invention to provide unique nonlinear circuit means that overcome the above and other disadvantages of the prior art.

It is another object of this invention to provide network means for generating a nonlinear function having an accuracy comparable to that of prior art function generators, but which occupies only a fraction of the space required for, and which costs only a fraction of, a prior art function generator.

It is a further object of this invention to provide a nonlinear computing device for generating a voltage that varies as the square or the cube of an input voltage, but which occupies a space of only approximately three (3) cubic inches.

A still further object of this invention is to provide a network or circuit including variable resistance devices to generate and process a number of voltages having predetermined nonlinear waveforms.

Yet another object of this invention is to provide a unique electrical device for generating a nonlinear voltage waveform that corresponds to a known mathematical function, and unique circuit means including one or more of such devices to obtain an output voltage of desired characteristics.

It is still a further object of this invention to provide a nonlinear network unit that occupies only a small fraction of the space required for a highly complex prior art function generator used for the same purpose, which has an accuracy corresponding to that of, and which is more reliable and trouble-free than, such prior art function generator.

It is also an object of this invention to provide unique means for generating electrical analogs of desired mathematical functions, and which comprises a minimum number of component parts of simple design and rugged construction.

The above and other objects and advantages of this invention will become apparent from the following description taken in conjunction with the accompanying drawings of illustrative embodiments thereof, in which:

FIGURE 18 is a schematic diagram of a varistor network unit arranged to develop an output voltage that varies as the cube of the input voltage;

FIGURE 19 is a plot of a resulting error function to be displayed by an oscilloscope in testing and optimizing the number of varistors and associated series resistance for a cubing unit;

FIGURE 20 is a schematic diagram of a circuit employing an operational amplifier and our cubing network unit to develop an output voltage of desired magnitude;

FIGURE 21 is a plot of the output voltage versus the input voltage for the circuit of FIGURE 20, showing the output waveform to be symmetrical with respect to the origin of the rectangular coordinates;

FIGURE 34 is a schemmatic diagram of another novel circuit employing both squaring and cubing varistor networks to develop an output voltage that varies as either a truncated series representing the cosine function of an input voltage, or a truncated series representing the probability function of the input voltage;

FIGURE 35 is a plot of the output voltage versus the input voltage of the circuit of FIGURE 34 for the combination of settings of various potentiometers to provide an output corresponding to the truncated series representing the cosine function;

FIGURE 36 is a plot of the output voltage versus the input voltage for the circuit of FIGURE 34 obtained with a setting for the various potentiometers that results in an output representing the probability function;

FIGURE 37 is a schematic diagram of a novel network employing varistor squaring network units to develop respective output voltages at two different points therein which vary as the cosine and the square of the sine of an input voltage;

FIGURE 38a is a plot of the parabolic voltage waveform that obtains in one part of the circuit of FIGURE 37;

FIGURES 38b, 38c are plots of the respective output voltages from the circuit of FIGURE 37;

FIGURE 51 is a schematic diagram of still another network of our invention employing varistor squaring networks to obtain a voltage representing the quotient of quantities represented by respective input voltages.

Figure 1:
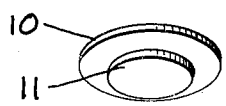
FIGURE 1 is a perspective view of one form of varistor device employed in our unique function-generating network.
Figure 2:
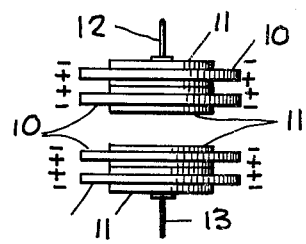
FIGURE 2 is an elevation view of a plurality of the varistors arranged in a stack so as to be connected in series.
Figure 3:
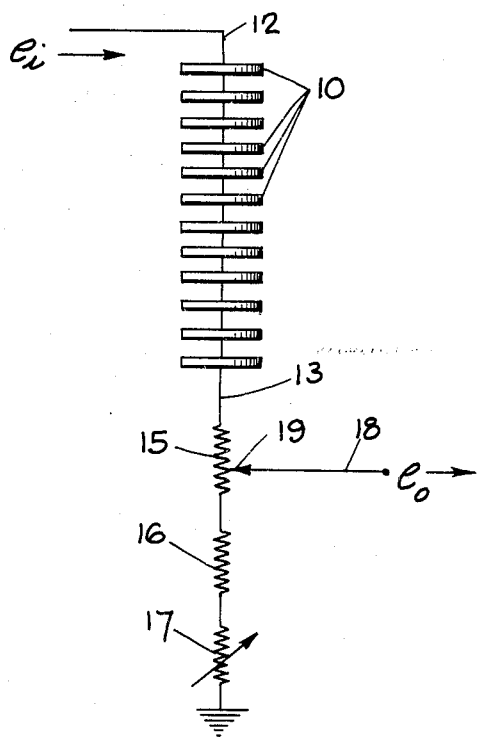
FIGURE 3 is a schematic diagram of our network unit for developing an output voltage that is the square of an input voltage, showing resistances in series with the varistors for obtaining optimum operating characteristics and to facilitate picking off voltages of predetermined magnitude.

Referring to FIGURES 1–3, our invention makes use of varistor elements 10. The elements 10 may have a variety of shapes, one example of which is the button or disc form illustrated in FIGURE 1. Each of these circuit means is adapted for connection in a circuit, e.g., by having its opposite surfaces tinned, as at 11, with conductive metal. An element 10 is characterized as a current device in which current flow varies as some power of a voltage applied thereto. A typical element of this type is made from silicon carbide.

As is well known, variable resistance elements made of silicon carbide were developed as a result of problems encountered with lightning. In this connection, it was desired to have a pointed object, such as a lightning rod, placed on a roof top in such a position that a bolt of lightning would strike the rod and be conducted to ground without damaging the building or home. However, the better the conducting path to the earth, the more likely was the lightning strike to be attracted to the lightning rod. Thus, it was described to find some way to discourage a lightning strike and, at the same time, to provide an excellent conductive path to earth. The problem therefore resolved itself into finding a suitable substance that normally would exhibit a very high impedance to current flow, i.e., in the absence of an electrical charge, but which would have very low or negligible resistance in the presence of a charge.

The substance that exhibited the desired conductive properties was found in the composition known as silicon carbide, which was made up in granular form and then compressed under high pressure and temperature. Typically, silicon-carbide rods are formed, and then are sliced to provide individual elements of desired configuration. To employ a silicon carbide element, such as the element 10 illustrated in FIGURE 1, in a lightning-arrester circuit, all that is necessary is to connect it between the lightning rod and ground.

In engineering terminology, a variable resistance element of the type above described is denoted a "varistor." Unlike the ordinary linear resistor, wherein the current is directly proportional to applied voltage across it, as exemplified in Ohm's law, i.e.

$$I = \frac{E}{R}$$

the function of the varistor is exemplified by the equation $$I = k e^n$$

where $e$ = the applied voltage, $k$ = a constant of proportionality, and $n$ = some power of the applied voltage.

In addition to lightning-arrester applications, individual varistors have been used for such purposes as regulating the filament voltage on a vacuum tube, minimizing voltage variations caused by a changing load connected to a voltage source, and preventing arcing between relay contacts. As will be recognized, none of these applications calls for any critical selection of a varistor. Typically, the exponent $n$ varies between 2.0 and 4.0, and the selection of a particular varistor for such applications is generally dictated by the rapidity with which it is desired that the resistance decrease in the presence of an applied voltage.

The nonlinear electrical characteristics of the varistor have made it the subject of considerable research to adapt it for use in solving many nonlinear problems. However, such research has been frustrated because of various inaccuracies inherent in the varistor itself. For example, the exponent $n$ varies unpredictably between varistors made in a single production run. Also, the varistor is characterized by an unduly large negative temperature coefficient. Further, a varistor exhibits some semiconductivity, and it is otherwise objectionable because it does not have a sufficiently wide dynamic range of operation for critical applications. Even the most elaborate pains could be taken in manufacture without successfully ridding a varistor of all the objections mentioned. Accordingly, it has generally been conceded that varistors are not suitable elements for use in solving nonlinear problems.

Our invention, however, uses varistors having just such variations in characteristics, yet substantially eliminates all the foregoing objections to the use of such a varistor in nonlinear techniques. Referring to FIGURES 2 and 3, we utilize a stack of varistors 10, wherein the tinned surfaces 11 of adjacent varistors are placed in abutment. Circuit leads 12, 13 are conductively secured to the tinned surfaces 11 of the varistors at each end of the stack, whereby the varistors 10 are connected in series between the leads 12, 13. Because an individual varistor, wherein the exponent $n$ approximates the second power, has an optimum operating point wherein the voltage across it is in the neighborhood of 8 volts, limitations imposed upon auxiliary equipment prevent full utilization of its dynamic range. We have found that a stack of varistors permits voltages in a more useful range, e.g., 100 volts, to be applied across the stack, whereby auxiliary equipment can be employed to utilize its full range. However, in our invention, $n > 2$ for the stack. Since the exponent $n$ for all varistors in a stack is not the same, different numbers of varistors may be needed in different stacks to effect their use at the same operating point. However, and as will be apparent, merely stacking varistors together to handle a desired higher voltage does not mean the stack will function properly. As will be seen from the description of FIGURE 3, our circuit provisions, including the stack, insure the proper operation and results.

The magnitude of the output of an optimized varistor squaring unit is not equal to the square of the input voltage. Instead, the output voltage varies as the square of the input voltage, but at a fraction of the magnitude of the input voltage. This relationship is represented by $e_0 = k e_i^2$, where $k = a$ constant of proportionality. For example, in a varistor squaring unit that is calibrated for an input voltage between ±100 volts, the output voltage is $e_0 = 0.002\ e_i^2$, or a voltage that varies between ±20 volts. Such voltage may be utilized for any desired purpose, e.g., controlling the movement of a structure, operating a vacuum tube, or operating any device that functions effectively in response to the square of a voltage.

These small semiconductive effects of an individual varistor, which is objectionable in critical applications, is compensated for in our invention by properly orienting the varistors. For example, referring to FIGURE 2, the top varistor in the stack is shown to have a semiconductive effect, the upper and lower surfaces thereof being represented as having negative and positive polarities, respectively. The varistor in contact with the top varistor is arranged in back-to-back relation wherein the surface indicated to be positive is in abutment with the positive surface of the uppermost varistor. Thus, if these varistors exhibit the same semiconductivity, their semiconductive effects are nullified by placing them in back-to-back relation.

It is not essential that individual varistors be selectively oriented in the above-described fashion. It is enough that the varistors in the stack be oriented so that the stack has minimum semiconductivity. In general, different varistors exhibit different degrees of semiconductivity. Consequently, whatever the number of varistors in a stack, they are arranged so that one semiconductive polarity exhibited by any number of the varistors is offset by an opposite semiconductive polarity exhibited by the remaining varistors.

Referring to FIGURE 3 along with FIGURE 2, we illustrate a plurality of varistors 10 connected in series, wherein the lead 12 is connected to a voltage source $e_i$. The lead 13 is connected to a resistive network that includes a fixed resistor 15, a resistor 16 having a negative temperature coefficient (i.e., a thermistor), and a variable resistor 17, the latter resistor being connected to a point of reference or ground potential. The output voltage $e_0$ is shown to appear at an output lead 18 that is connected to a sliding contact 19 on the resistor 15.

As has been mentioned, varistors are current devices. Thus, the resistance in circuit with the series varistors serves to permit a voltage to be picked off that varies as the current through such resistance. The total resistance also functions to ensure that the output voltage $e_0$ varies as the square of the input voltage $e_i$. This will be made more apparent hereinafter in the description of FIGURE 6.

The thermistor 16 is a resistor having a negative temperature coefficient. As has been mentioned, a varistor has a negative temperature coefficient, and such a characteristic is exhibited by the stack of varistors. The thermistor is selected to ensure that the negative temperature coefficients of the resistive paths on either side of the output lead 19 are the same. Thus, the thermistor 16 compensates for the effects of the negative temperature coefficient of the stack of varistors.

As previously indicated, a typical diode function generator, for developing an output voltage that accurately represents the square of an input voltage, is one that occupies a space of upwards to three cubic feet. By way of contrast, a varistor network made up of parts connected as shown in FIGURE 3 occupies a volume of substantially only three cubic inches. With such a small unit, we are able to enclose it in a small housing 20 (see FIGURE 4) which at one end is provided with pins 21–24 extending through an octal-base member 25 that is secured to the housing 20. The varistors 10, which are formed of buttons or disc elements approximating a ten-cent coin in size, are stacked in the manner shown in FIGURE 2 and supported in such stacked relation within the housing 20. Also within the housing, are located the resistor 15, the thermistor 16, and the variable resistor 17, all connected as shown in FIGURE 3.

One of the pins 21, is provided for connection internally of the housing 20 to the lead 12; another pin 22, is provided for connection internally to the sliding contact 19; still another pin 23, is provided for connection to the variable resistor 17. The pins 21–23 thus constitute external connections for the network of FIGURE 3, so that they can be inserted in sockets of a mating socket member (not shown). The pin 24 provides an alternate connection that is made to the sliding contact 19 through a resistor (not shown) for connection to an external circuit.

Adjustments of the variable resistor 17 and the sliding contact 19 are effected through adjusting screw elements 26, 27 extending to the exterior of the housing 21.

Figure 5:
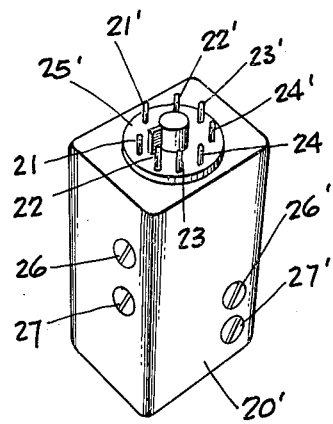
FIGURE 5 is a perspective view of a container adapted to house two of our function-generating network units, to aid in explaining the advantages of our invention.

FIGURE 5 illustrates a housing 20' for two varistor network units, and an octal-base member 25' is provided having respective sets of pins 21–24, 21'–24' for the units. Similarly, adjusting screw elements 26–27, 26'–27' are provided for adjusting the respective sliding contacts and variable resistors of the units. Since the units comprise resistive elements only, two (or more) can be safely enclosed in the same container, i.e., there are no inductive effects.

As above described, the network of FIGURE 3 develops an output voltage $e_0$ that varies as the square of the input voltage $e_i$. To ensure this result (it is essential that the number of varistors 10 and the total resistance employed, be correct. To effect optimization of these parameters, we employ the unique circuit illustrated in FIGURE 6.

Figure 6:
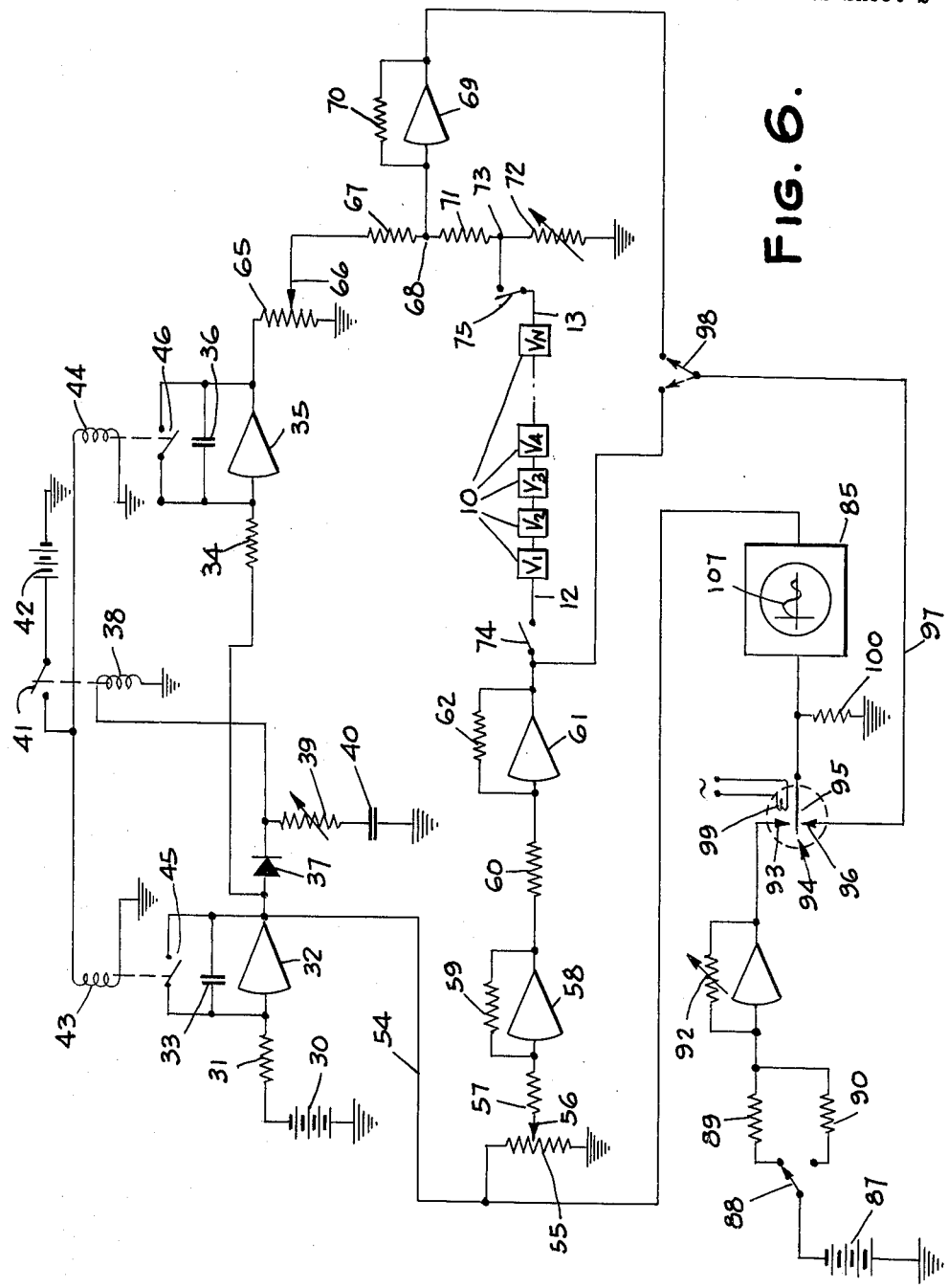
FIGURE 6 is a schematic diagram of the unique test circuit for optimizing the various parameters of our squaring unit, wherein a parabolic waveform derived from double integration of a constant voltage is used to provide a standard with which to compare the parabolic output of the unit, from which the number of varistors and the associated resistance values are determined.

Referring to FIGURE 6, a source 30 of fixed voltage, such as a mercury battery, is coupled through a resistor 31 to the input of an integrator that includes an operational amplifier 32 having a capacitive feedback connection 33. The output of this integrator is connected to the input resistor 34 of another integrator that includes an operational amplifier 35 having a capacitive feedback connection 36. As is known, double integration of a constant voltage results in a voltage of parabolic waveform.

The integrators are arranged to operate so that their outputs are cylical, i.e., repetitive output voltages are developed which range between zero and a predetermined maximum. To this end, a unidirectional conductive device, shown as a diode 37, is connected in the forward direction between the amplifier 32 and a relay control coil 38, and a series RC (resistor-capacitor) network 39, 40 is connected between the diode 37 and ground. The coil 38 is energized sufficiently, at a predetermined level of the voltage in the output of the amplifier 32, to close a normally open switch 41.

Closure of the switch 41 conects a D.C. voltage source 42 to a pair of relay control coils 43, 44. The coils 43, 44, upon being energized from the source 42, close respective normally open switches 45, 46 that are conected across the capacitors 33, 46, thereby effecting the discharge of the capacitors to cause the output voltage from the amplifiers 32, 35 to drop to zero. Thereafter, the coil 38 is de-energized to open the switches 45, 46 and permit the integrators to again function. In this manner, the outputs of the integrators are made repetitive.

Figure 7A:
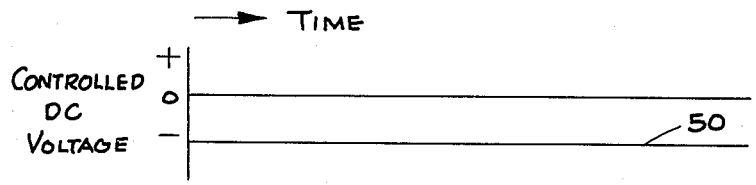
FIGURE 7a is a plot of the waveform of the voltage of the D.-C. voltage source of FIGURE 6.
Figure 7B:
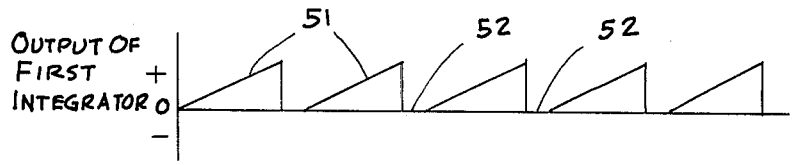
FIGURE 7b is a plot of the output voltage of the first integrator of FIGURE 6.
Figure 7C:
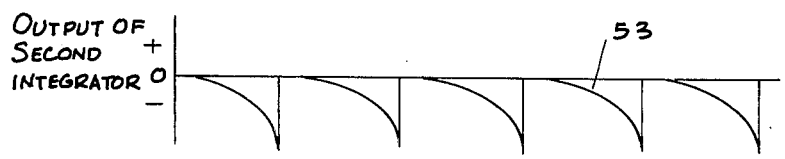
FIGURE 7c is a plot of the voltage appearing at the output of the second integrator, showing the parabolic waveform representing the square of the voltage from the first integrator.

FIGURES 7a–7c illustrate the operation of the above-described portion of the circuit of FIGURE 6. The constant output from the source 30 is indicated at 50 in FIGURE 7a. The integration of this constant voltage results in a linear sawtooth wave 51 in the output of the amplifier 32 (FIGURE 7b). Referring again to FIGURE 6, the length of each such linear voltage excursion is determined by the battery 30, the resistor 31, the capacitor 33, and the relay 38. For a particular battery, the resistor 31, the capacitor 33, and the relay 38 are designed so that each linear excursion in the output of the amplifier 32 lasts for a predetermined period, e.g., one second.

With reference to FIGURE 7b along with FIGURE 6, it will be noted that the sawtooth 51 is made up of a plurality of linear voltage excursions wherein a short delay 52 occurs between the end and beginning of successive excursions. The delay periods 52 between successive excursions of the sawtooth are the result of the time constant established by the resistor 39 and the capacitor 40. During each linear excursion of the voltage in the output of the amplifier 32, the capacitor 40 is charged. This charge prevents the relay 38 from being de-energized instantaneously upon the voltage in the output of the amplifier 32 dropping to zero. Instead, and since the diode 37 prevents current from flowing from the capacitor 40 toward the amplifier 32, the capacitor 40 discharges through the coil 38. The time constant of the resistor 39 and the capacitor 40 determines the time lag between successive excursions of the linear sawtooth, and such delay period 52 (e.g., 50 milliseconds) is sufficient to ensure that the voltage in the output of the amplifier 32, and also the voltage in the output of the amplifier 35, will drop to zero before the beginning of the next linear sawtooth sweep.

FIGURE 7c shows that the parabolic waveform 53 of the voltage in the output of the second integrator, which is the desired waveform resulting from a double integration of a constant voltage, is the square of the voltage 51. The delay between successive parabolic excursions is the same as that between successive linear excursions, due to the fact that the relays 43, 44 are operated in parallel.

In FIGURES 7a–7c, it will be noted that the constant voltage 50 is of negative polarity, the linear sawtooth 51 is of positive polarity, and the parabolic output 53 is of negative polarity. It will be recognized that these results are obtained from the normal operation of the operational amplifiers 32, 35, which generally function to invert an input waveform, as well as performing the desired function, such as the integration above described. The amplifier 32 functions not only to integrate but also to amplify; thus, the output sawtooth 51 reaches a level higher than the input voltage, e.g., of the order of 28 volts for an input voltage of eight volts. The amplifier 35 functions to provide parabolic excursions 53 substantially without amplification; in the foregoing example, the peaks of the parabolic output are approximately 28 volts.

The output of the amplifier 32 is connected, as at 54, to a potentiometer 55 having its sliding contact 56 coupled through a resistor 57 to the input of an operational amplifier 58. This amplifier 58 is provided with a resistive feedback, as at 59, so as to provide in its output an amplified, inverted version of the voltage picked off the potentiometer 55, such amplification being dictated by the ratio of the resistance of the feedback resistor 59 to the resistance of the input resistor 57. The output of the amplifier 58 is then applied through a resistor 60 to the input of a succeeding operational amplifier 61 that also has a resistive feedback indicated by a resistor 62. The amplifier 61 merely inverts the voltage applied to its input, i.e., the feedback resistor 62 and the input resistor 60 have the same values.

The output of the second integrator amplifier 35 is provided with a potentiometer 65 that has its sliding contact 66 connected through a resistor 67 to the summing junction 68 of an operational amplifier 69 having resistive feedback, as indicated at 70. Also connected to the junction 68 is a resistor 71, and a variable resistor 72 is connected between the resistor 71 and ground.

A plurality of varistors $V_1$ $V_2$, . . . $V_n$, like the varistors 10 previously described, are stacked and connected between the output of the amplifier 61 and the junction 73 of the resistors 71, 72. Respective switches 74, 75 are connected in the output of the amplifier 61 and to the junction 73 of the resistors 71, 72. The stack of varistors $V_1$, $V_2$, . . ., $V_n$ is arranged with the leads 12, 13 at the ends of the stack being adapted for connection by the switches 74, 75. Thus, when the switches 74, 75 are closed, the stack of varistors is connected between the amplifier 61 and the junction 73 of the resistors 71, 72. As indicated, the varistors are generally characterized by an exponent $n > 2.0$.

Where a varistor network is to be employed in an analog computer system, it is desirable to have the input voltage thereto controlled so as not to exceed a predetermined level of operation of other circuits in the system. For example, many computers have circuits which are designed to operate with voltages that do not exceed ±100 volts. Accordingly, the voltage in the output of the amplifier 61 should be 100 volts, so as to permit the number of varistors and the resistance associated therewith to be determined for optimum operation in the voltage range ±100 volts. To this end, the sliding contact 56 of the potentiometer 55 is positioned so as to pick off a predetermined portion of the voltage applied thereto from the output of the amplifier 32, e.g., a voltage that reaches a maximum of 20 volts, and the amplifiers 58, 61 are arranged to provide the desired 10 volts to the varistor network under test. For example, the amplifier 58 may have the resistors 57, 59 so arranged that the resistor 59 has a resistance five times the resistance of the resistor 57. Accordingly, a peak voltage of 20 volts picked off the sliding contact 56 results in a peak output of 100 volts from the amplifier 58. For the amplifier 61, the resistors 60, 62 are of the same values, whereupon the amplifier 61 operates as a unity gain amplifier, so that its output is a linear sawtooth of the same magnitude as that of the output of the amplifier 58, but inverted.

We utilize the circuit of FIGURE 6 to determine the total number of varistors $V_1$, $V_2$, . . ., $V_n$, and the total resistance to be connected in circuit with the varistors, for establishing a voltage at the junction 73 that varies as the square of the voltage appearing in the output of the amplifier 61. To this end, the sliding contact 66 in the output of the amplifier integrator 35 is arranged to pick off a voltage in the output of the amplifier 35 such that the peak magnitude of the parabolic excursion is the same as the peak magnitude of the output of the varistor network, i.e., 20 volts. Similarly, the resistor 67 is chosen to be of the same value as the resistor 70 in the feedback network of the amplifier 69, whereby the peak voltage appearing in the output of the amplifier 69 in response to the voltage picked off the potentiometer 65 will be limited to the same peak value.

Figure 7D:
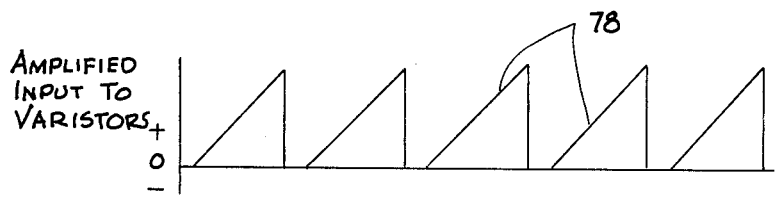
FIGURE 7d is a plot of the linear voltage developed by the first integrator, as amplified and applied to the input of the varistor network.
Figure 7E:
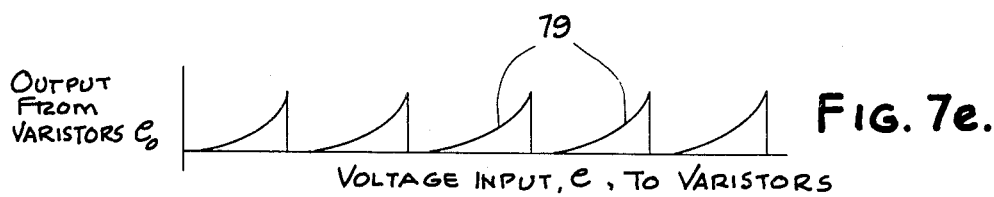
FIGURE 7e is a plot of the output voltage from the varistor network, showing the same parabolic waveform for the output voltage as for the output of the second integrator.

FIGURE 7d illustrates the amplified sawtooth waveform 78 that is applied to the varistor network, i.e., the voltage that appears in the output of the amplifier 61. The varistor network operates, when the proper number of varistors and the proper resistance is employed in connection therewith, to develop a voltage having a parabolic waveform that exemplifies the square of an input voltage. Thus, and referring to FIGURE 7e, the output of the varistor network is a series of parabolic excursions 79 that are generated in response to the sawtooth excursions in the output of the amplifier 61.

It will be noted that the sawtooth voltage 78 applied to the input of the varistor network is of positive polarity, and that the varistor network develops a parabolic excursion 79 of the same polarity. Thus, the parabolic waveforms 53, 79 appearing in the outputs of the amplifier integrator 35 and the varistor network are of opposite polarity, so that, when both are applied to the input of the amplifier 69, such amplifier will develop an output that represents the sum of these voltages. As will be apparent, if these voltages are precisely the same in every respect, the output of the amplifier 69 is zero. Therefore, in order to have an accurate standard by which to compare the varistor squaring function, the integrating amplifiers 32, 35 and their associated circuitry are carefully chosen and calibrated so that the parabolic voltage 53 in the output of the amplifier 35 is as accurate a representation of a parabola as it is possible to obtain.

An oscilloscope 85 is used to set the peak output of the amplifier 61 and the peak value of the voltage picked off the potentiometer 65 precisely. In this connection, the horizontal sweep of the beam of the oscilloscope 85 is controlled by the voltage in the output of the amplifier 32, i.e., the linear sawtooth. For the vertical movement of the beam, we employ means to provide an amplitude sensitivity of the desired peaks of the two voltages, e.g., the voltage picked off the potentiometer 65 and the voltage in the output of the amplifier 61. To this end, there is provided a D.C. voltage source 87 having a constant output, such as a mercury battery, having a switch 88 connected to its negative terminal. The switch 88 is adapted to be connected to one or the other of a pair of resistors 89, 90, for applying the D.C. voltage through one of such resistors to an operational amplifier 91. The amplifier is provided with resistive feedback, indicated by a variable resistor 92.

The output of the amplifier 91 is connected to one fixed contact 93 of a chopper network 94, such as a Stevens Arnold or a Brown chopper, that has its movable contact 95 coupled to the vertical input of the oscilloscope 85. The other fixed contact 96 on the chopper 94 is connected, as at 97, to a two-position switch 98 that is adapted, in one position, to be connected to the output of the amplifier 69, and in the other position to be connected to the output of the amplifier 61. As shown, the chopper network 94 is provided with an energizing coil 99 to be energized from an alternating voltage source, thereby to alternately connect the movable contact 95 thereof to the fixed contacts 93, 96. A resistor 100 is connected between the movable contact 95 and ground, to reduce transient effects in the switching in the chopper 94.

The resistors 89, 90, and the feedback resistor 92, are designed so that the output of the amplifier 91 will be recisely either 20 volts or 100 volts. For example, the resistor 90 may be a 1-megohm resistor, and the resistor 89 may be a 0.2-meghom resistor. For a battery voltage of 8 volts, the variable resistor 92 is adjusted so that, when the resistor 89 is connected to the battery 87, the output of the amplifier 91 will be precisely 20 volts. When the switch 88 connects the amplifier to the battery 87 through the resistor 90, the output of the amplifier 91 is precisely 100 volts.

Figure 8:
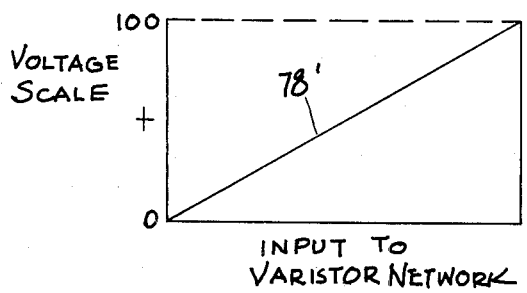
FIGURE 8 is a plot of the display on the oscilloscope in FIGURE 6 in checking the magnitude of the voltage applied to the varistor network being tested.

To check the voltage applied to the input of the varistor network, i.e., the voltage in the output of the amplifier 61, the switch 88 is positioned to connect the resistor 90 between the battery 87 and the amplifier 91, and the switch 98 is positioned to connect the output of the amplifier 61 to the fixed contact 96 of the chopper 94. Referring to FIGURE 8, this connection of the switches 87, 98 results in a presentation on the oscilloscope of a sawtooth waveform 78', and the sliding contact 56 is positioned so that the upper end of the sawtooth extends to a 100-volt reference line.

Figure 9:
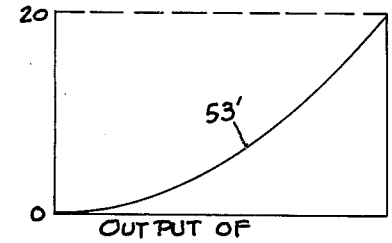
FIGURE 9 is a plot of the display on the oscilloscope of the output of the second integrator as employed for comparison with the output of the varistor network.

To check the output of the amplifier 35, the switch 75 is opened and the switch 98 is moved to the position wherein the output of the amplifier 69 is connected to the fixed contact 96 of the chopper 94. Also, the switch 88 is positioned so as to connect the resistor 89 between the battery 87 and the amplifier 91, and thereby establish a voltage of 20 volts in the output of the amplifier 91. Referring to FIGURE 9, these settings result in a presentation by the oscilloscope of a parabolic waveform 53' of positive polarity (due to inversion of the negative-polarity parabolic waveform in the output of the second integrator 35) that corresponds to the voltage excursions 53 in the output of the amplifier 35. The sliding contact 66 is positioned so that the parabolic waveform 53' terminates at a 20-volt reference line.

We have found that the parabolic output waveform from varistor networks varies widely from a true parabola with variations in the number of varistors employed and in the total amount of the resistance used in connection therewith. However, an optimized varistor network develops a parabolic voltage waveform that is so nearly a true parabola, being in error by such a small percentage, e.g., of the order of less than one-half of one percent error, that its use as a function-generating device is well suited for systems having rigid requirements for accuracy of voltage waveforms corresponding to the square of an input voltage.

Figure 10A:
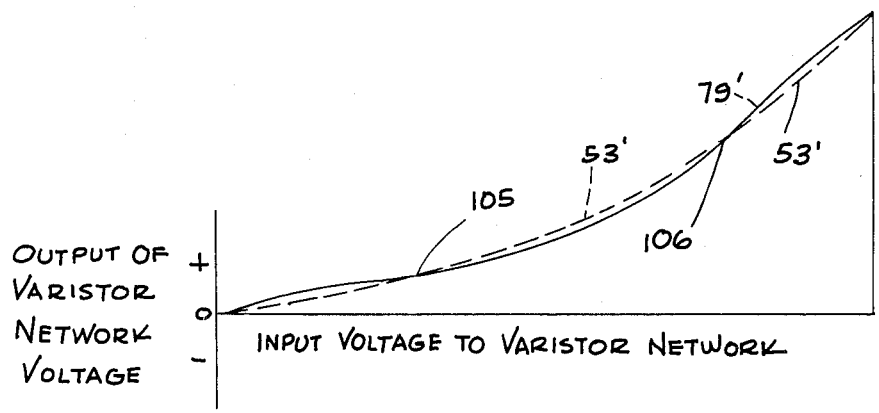
FIGURE 10a illustrates the waveform of the voltage output of the varistor network unit, with a voltage waveform corresponding to the output of the second integrator superimposed thereon in a manner to magnify the lack of coincidence between them.
Figure 10B:
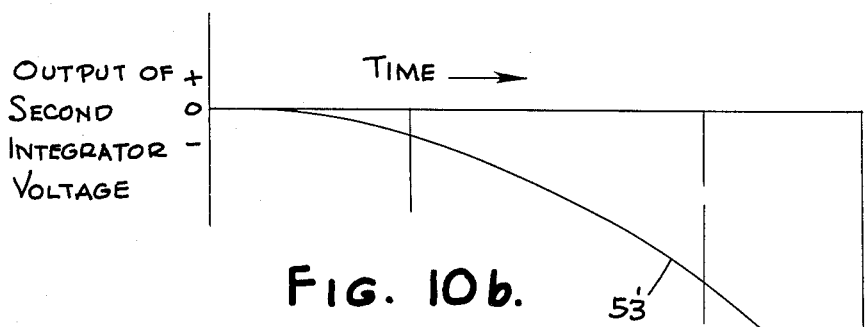
FIGURE 10b is a plot of the output voltage from the second integrator on an enlarged scale.

FIGURE 10a illustrates at 79' the display by the waveform of the voltage developed by an optimized varistor network. This trace is obtained by using the same settings for establishing the desired limits for the voltage picked off the potentiometer 65, but with such potentiometer disconnected from the amplifier 69, as by opening a switch 104 that is connected between the potentiometer and such amplifier. Also, the switches 74, 75 are closed to connect the varistors $V_1, V_2, \ldots, V_n$ between the amplifier 61 and the junction 73 of the resistors 71, 72.

In FIGURE 10a, the voltage 53' is shown inverted and superimposed, in dotted lines, on the voltage waveform 79' wherein their difference is magnified to illustrate how closely the output of an optimized varistor network unit conforms to the standard parabolic waveform. As shown, the waveform 79' is initially of the same magnitude as the voltage 53', i.e., both start from zero. Thereafter, the voltage 79' varies slightly relative to the true parabolic waveform 53', first being slightly greater in magnitude, then smaller in magnitude, and again increasing in magnitude, and coinciding at its peak with the peak of the voltage 53'.

Figure 10C:
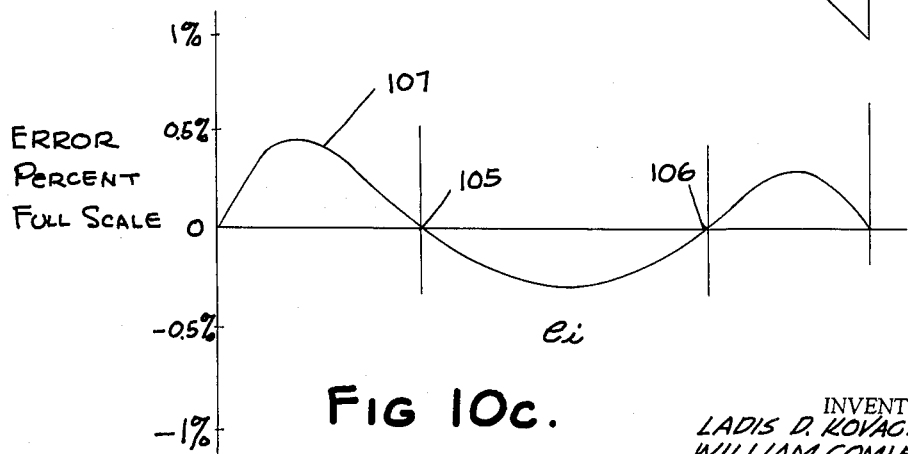
FIGURE 10c is a plot of the typical error function displayed by the oscilloscope, upon summation of the outputs of the second integrator and the varistor network, for the correct number of varistors and magnitude of associated series resistance.

Thus, the voltages 53', 79' are precisely the same at four points, i.e., the origin, the first and second cross-over points 105, 106, and the peaks. Referring to FIGURE 10c, this variation of the output of the varistor network with respect to the standard voltage is reflected in an error-function curve or waveform 107 that obtains on summing the voltages from the second integrator and the varistor network. For purposes of analysis, an optimized varistor network has been found to result in an error function 107 that is a maximum between zero and the first cross-over point 105, such maximum being of the order of 0.4% error, and the magnitude of the error function between the cross-over points 105, 106, and between the cross-over point 106 and the peak of the sweep, is the same, and has been found to be of the order of 0.3% error.

Thus, in the circuit of FIGURE 6, it is desired to change the number of varistors and adjust the resistance of the resistor 72 until the error function curve 107 presented on the oscilloscope 85 has the same appearance as shown in FIGURE 10c.

FIGURES 11a–11f illustrate error function curves obtained in adding to a stack of too few varistors, and adjusting the resistor 72, so as to obtain the desired shape of the error function curve. If there are too few varistors to begin with, the curve may be entirely above the abscissae, as indicated at 108 in FIGURE 11a. A scaling correction, by adjustment of the sliding contact 66, causes the curve to meet the abscissae at both the beginning and the end of the sweep, as indicated at 109 in FIGURE 11b. Then the resistor 72 is adjusted to increase the resistance in circuit with the varistors, and this causes the curve to change shape, as indicated at 110 in FIGURE 11c, so that there is one cross-over point 111 intermediate the ends of the sweep. Adding varistors causes the curve to change further so that, as indicated at 112 in FIGURE 11d, it lies entirely below the abscissae between the beginning and the end of the sweep. Further adjusting the resistor 72 is done until the curve, as indicated at 113 in FIGURE 11e, crosses the abscissae at two points intermediate the beginning and end of the sweep. In each of the operations to change the error function, scaling adjustment is made to ensure that the curve meets the abscissae at the ends of the sweep.

Figure 11A:
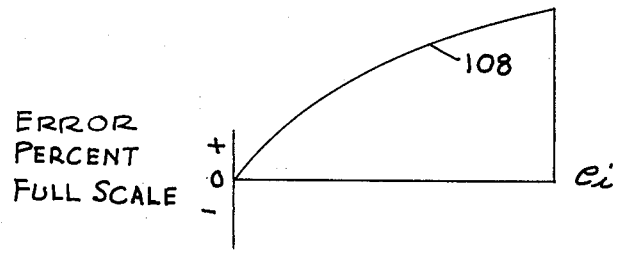
FIGURES 11a–11f illustrate different error function curves obtained, in one example, by varying the number of varistors and the associated series resistance to arrive at the desired shape of the error function curve.
Figure 11B:
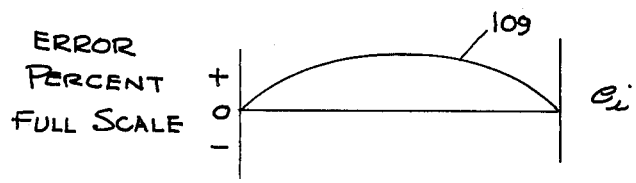
Figure 11C:
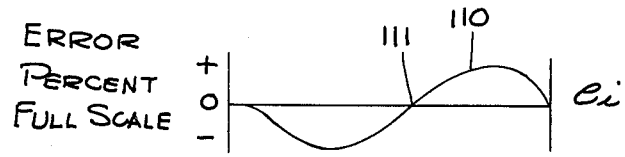
Figure 11D:
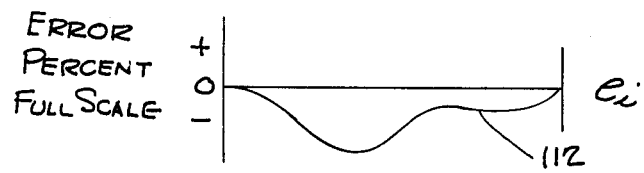
Figure 11E:
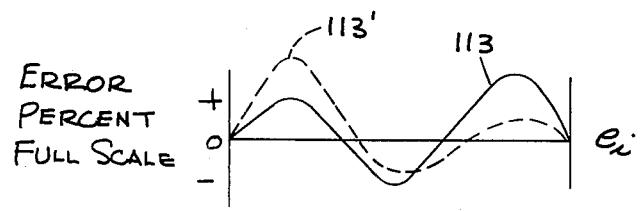
Figure 11F:
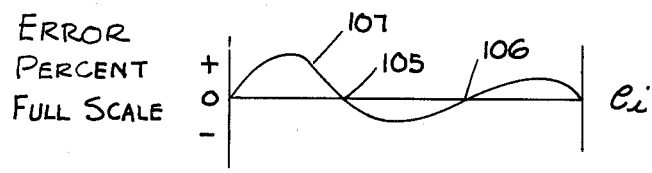

Referring to FIGURE 11e, when the first peak of the error function is smaller in magnitude than the other peaks, this signifies that there are too few varistors. Conversely, if the successive peaks of the first error function are in decreasing order, as indicated by the dotted curve 113′, there are too many varistors. Thus, by adding or removing varistors, one at a time, we arrive at the optimum error function 107, as illustrated in FIGURE 11f.

Figure 4:
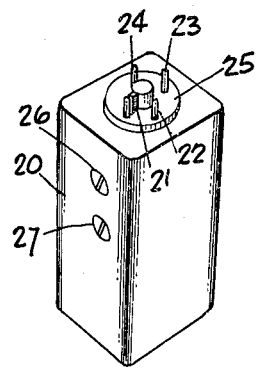
FIGURE 4 is a perspective view of a container for our function generator unit, to illustrate how it is adapted as a plug-in unit for inclusion in a circuit.

After the desired shape of the error function is determined, resistor elements 15–17 (FIGURE 3) are chosen such that adjustment of the resistor 17 results in a total resistance equal to that represented by the setting of the resistor 72. The varistors $V_1$, $V_2$, . . . ,$V_n$ and the resistors 15–17 are then mounted in a housing, as illustrated in FIGURE 4, with the pin connections 21–24 and adjusting elements 26, 27 arranged as previously described. The assembled unit is then checked in the circuit of FIGURE 6. To do this, the resistor 72 is removed, and the pin connected to the sliding contact 19 is connected to the switch 75. The element 26 is then manipulated to vary the resistor 17 to make the total resistance of the resistors 15–17 the same as that of the resistor 72 used for calibration. The adjusting element 27 is operated to position the sliding contact 19 so that the peak output of the assembled unit corresponds to that of the reference parabola. In this manner, the assembled unit is adjusted to obtain an oscillogram of the desired error function 107.

Figure 12:
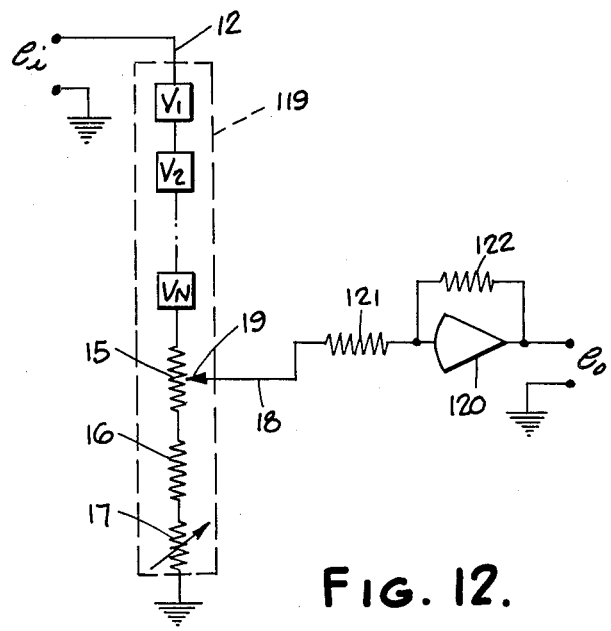
FIGURE 12 is a schematic diagram of a circuit for developing and utilizing the square of an input voltage, showing a computing or operational amplifier used in conjunction with our squaring network unit to obtain an output voltage of desired magnitude.

FIGURE 12 illustrates circuit means including a varistor squaring network unit 119 to develop an output voltage $e_0$ that varies as the square of the voltage $e_i$, but which has a peak amplitude equal to the peak of the input voltage. An operational or computing amplifier 120 is connected through a resistor 121 to the output lead 18 of the unit 119, and a feedback resistor 122 is provided across the amplifier 120.

For computer applications, the ratio of the resistances of the resistors 122, 121 is such that the voltage in the output of the amplifier 120 has a peak value equal to the peak of the input voltage. For example, where the input voltage $e_i$=100 volts, the varistor squaring unit 119 operates to develop a voltage of one-fifth of the input voltage, i.e., 20 volts. Preferably, the resistor 121 has the same value of resistance as the load resistance 71 (of FIGURE 6) into which the unit worked while being optimized, e.g., 0.2 megohm. The resistor 122 is accordingly selected (e.g., 1 megohm) so that the output of the amplifier 120 will have a gain of 5, thereby to produce an output voltage $E_0$=100 volts.

It has been found that the maximum voltage across the linear resistance portion of an optimized squaring unit is not precisely one-fifth of the peak input voltage, but is somewhat higher. For a unit designed to operate in response to an input voltage $e_i$=100 volts, the voltage that can be picked off the sliding contact 19 reaches a maximum between 21 volts and 25 volts, the exact value depending upon the number of varistors and total linear resistance employed therewith. Accordingly, the sliding contact 19 can be positioned to pick off a voltage that has a peak value of precisely one-fifth the peak input voltage, e.g., 20 volts in the presence of $e_i$=100 volts. Thus, with a 5-gain amplifier, it is known that an output voltage of 100 volts is obtained with an input voltage $e_i$=100 volts.

Figure 13:
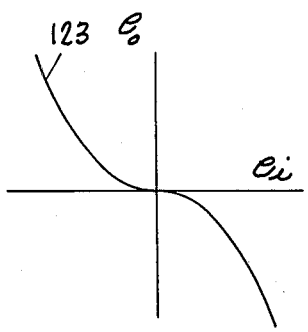
FIGURE 13 is a plot of the output voltage versus the input voltage obtained with the circuit of FIGURE 12.

For values of the input voltage $e_i$ between positive and negative limits of magnitude, the circuit of FIGURE 12 develops an output voltage $e_0$ that, when plotted on rectangular coordinates, shows origin symmetry. Referring to FIGURE 13, when the input voltage $e_i$ is negative, the output voltage $e_0$ is positive. As the input voltage $e_i$ increases to zero, the output voltage follows a parabolic curve as shown. When the input voltage $e_i$ is positive, the output voltage $e_0$ is negative, such output voltage decreasing in parabolic fashion as the input voltage increases from zero volts. The curve 123 is shown for the procedure wherein the input voltage $e_i$ is a linear voltage having a positive slope. If the input voltage is a linear voltage having a negative slope, the curve is reversed, so that the upper portion thereof lies in the third quadrant, and the lower portion thereof lies in the first quadrant.

Referring to FIGURE 4 along with FIGURE 12, it has been indicated that resistive means could be connected internally of the housing 20 so as to utilize the pin 24 as an output connection. Regarding to circuit of FIGURE 12, the resistor 121, which has a resistance equal to that of the resistor 71 employed as the load for the optimized varistor network, constitutes the desired impedance to be connected to the sliding contact 19 in utilizing the squaring unit 119 with the computing amplifier 120. Accordingly, the resistor 121 may be connected internally of the housing 20 between the pins 22 and 24, in which the pin 24 is connected directly (through the mating socket) to the summing junction 18′ of the amplifier 120.

As explained above, the plot of the output voltage versus the input voltage for the circuit of FIGURE 12 results in the curve 123 being symmetrical about the origin. To further aid in understanding the invention,, let it be assumed that the full-scale voltage for the input voltage is 100 volts, i.e., $e_i$=±100 volts. The mathematical expression for the voltage in the output of the amplifier 120 is $$e_0 = -0.01 e_i^2 (\text{sgn } e_i)$$

Thus, for $e_i$=±100 volts, then $0.01 e_i^2$=100 volts. The minus sign in the foregoing equation represents the inversion by the amplifier 120 of the voltage appearing between the lead 18 and ground. The notation "sgn $e_i$" denotes the signum function, whereby to signify the introduction of a "+" or "−" sign, depending upon the polarity of the input voltage $e_i$. Thus, when the input voltage $e_i$ is negative, the output voltage $e_0$ is positive; and when the input voltage is positive, the output voltage is negative.

Figure 14:
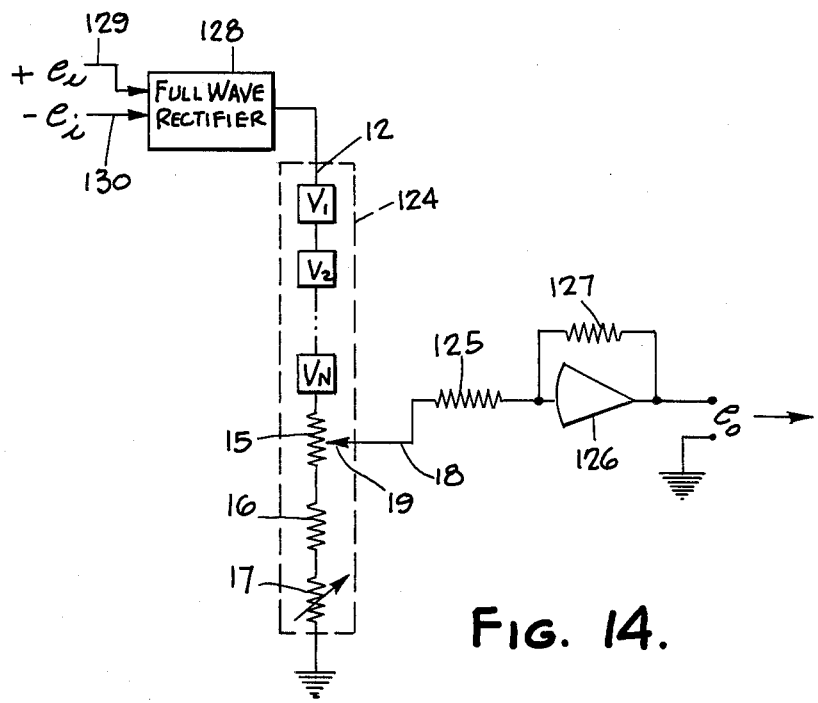
FIGURE 14 is a schematic diagram of a circuit of our invention for generating the square of an input voltage, wherein all portions of the output voltage have the same polarity.

FIGURE 14 illustrates a circuit in accordance with our invention for developing an output voltage that corresponds to the square of an input voltage, wherein a plot of such output voltage shows that it is symmetrical with respect to the y-axis of rectangular coordinates. Referring to FIGURE 14, there is shown a varistor squaring unit 124 constructed as previously described. The output lead 18 is connected through a resistor 125 to the input of a computing amplifier 126 having resistive feedback, as represented by the resistor 127. As is FIGURE 12, the resistor 125 preferably is the same as the load into which the output of the unit worked. Also, the ratio of the resistances of the resistors 127, 125 is such that, for full-scale input, the output of the amplifier 126 is of the same magnitude as the input voltage.

Figure 15:
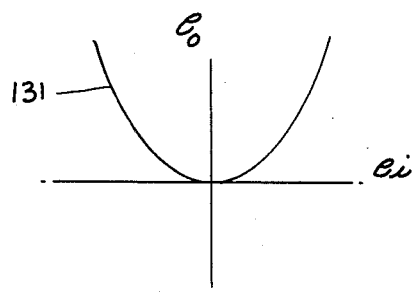
FIGURE 15 is a plot of the output voltage versus the input voltage for the circuit of FIGURE 14, showing the output voltage waveform to have y-axis symmetry.

As shown in FIGURE 14, the squaring unit 124 is connected between a full-wave rectifier 128 and ground. The rectifier 128 is adapted to receive input voltages of the same magnitude but opposite sign, indicated at 129, 130 as $e_i$, $-e_i$. The polarity of the rectified voltage appearing on the lead 12 depends upon the arrangement of the rectifier circuits. If the output of the rectifier 128 is negative, the squared voltage appearing at the output lead 18 is also negative. Therefore, after amplification and inversion by the amplifier 126, an output voltage $e_0$ is developed that is positive, and follows a parabolic curve 131 (see FIGURE 15) that is positive for all values of the input voltage $e_i$ above and below zero. As will be seen, if the output of the rectifier 128 is positive, the voltage appearing at the output lead 18 is positive, so that the voltage $e_0$ is negative. In this case, the curve 131 is reversed, i.e., the output voltage is negative for all values of the input voltage above and below zero volts.

Unlike the circuit of FIGURE 12, the circuit of FIGURE 14 effectively applies to the squaring unit 124 a voltage that is equal to the absolute magnitude of the input voltage $e_i$ without reference to whether the voltage $e_i$ is positive or negative. It is only the arrangement of the circuits within the rectifier 128 that determines whether the voltage appearing at the lead 12 is positive or negative. Accordingly, the equation $$e_0 = 0.01 e_i^2$$

mathematically expresses the operation of the circuit of FIGURE 14 for maximum of the input voltage between ±100 volts.

Figure 16:
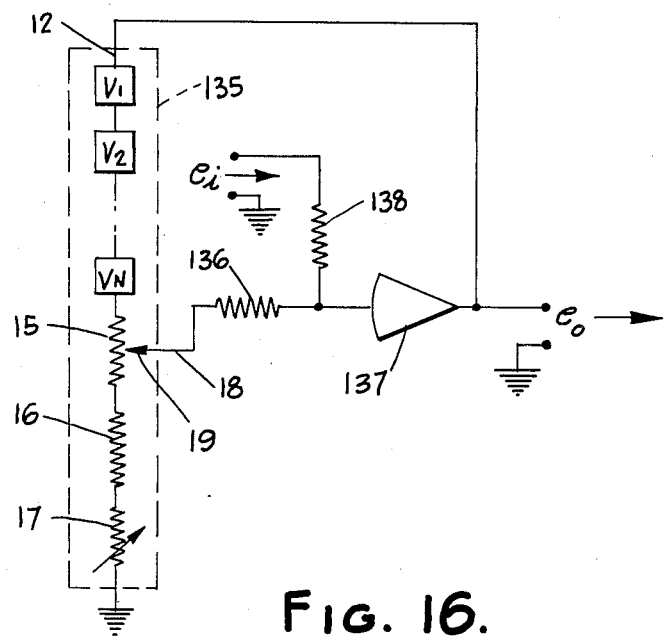
FIGURE 16 is a schematic diagram of our circuit employing a function generator for developing a voltage that varies as the square root of an input voltage.

FIGURE 16 illustrates a unique circuit employing a varistor squaring network unit 135 to develop a voltage that varies as the square root of an input voltage. The output lead 18 of the unit 135 is connected through a resistor 136 to the input of a computing amplifier 137. The unit 135 is connected between the output of the amplifier 137 and ground. An input voltage $e_i$ is applied through a resistor 138 to the summing junction of the amplifier 137.

Figure 17:
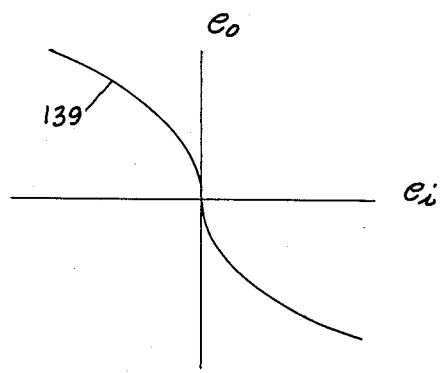
FIGURE 17 is a plot of the output voltage versus the input voltage for the circuit of FIGURE 16, showing the waveform as symmetrical about the origin.

FIGURE 17 illustrates the waveform 139 of the output voltage $e_0$, with variations in the input voltage between positive and negative values. To understand how the waveform 139 which represents the square root of the input voltage $e_i$ is obtained, it should be noted that the varistor squaring unit 135 is included in the feedback of the amplifier 137. The amplifier 137 is a high gain, high impedance device that responds to a varying feedback voltage so that its output varies oppositely. Since the network unit 135 is a squaring device, i.e., the voltage at the output lead 18 varies as the square of the input voltage $e_i$, the feedback voltage derived from the output of the squaring unit 135 causes the gain of the amplifier 137 to vary so that its output corresponds to the square root of the input voltage $e_i$.

The values of the resistors 136, 138 are chosen so that the peak output of the amplifier is equal to the magnitude of the input voltage at full scale. If $e_i = \pm 100$ volts, the resistors 136, 138 may be 0.2 megohm and 1.0 megohm, respectively, and for such values the mathematical expression for the function generated by the circuit of FIGURE 16 is:

$$e_0 = -10 \sqrt{|e_i|} \ (\text{sgn } e_i)$$

Thus, if the input voltag $e_i$ is 100 volts, the magnitude of the output voltage $e_0$ is:

$$e_0 = -10 \sqrt{100} \ (\text{sgn } 100)$$

Thus, $e_i = +100$ volts in this example, $e_0 = -100$ volts; and if $e_i = -100$ volts, $e_0 = +100$ volts. If various values of $e_i$ are substituted in the foregoing equation, a plot of $e_0$ vs. $e_i$ will be seen to result in the curve 139 representing the square root function.

The circuit of FIGURE 16 will be observed to develop an output voltage that varies as the square root of the input voltage for both negative and positive inputs. If desired, the circuit may be arranged so that the output voltage will be obtained only for input voltages of positive polarity. In this connection, all that is necessary is to provide a diode (not shown) connected in the forward direction between the input and output terminals of the amplifier 137. Such provision clamps the output voltages to zero reference for all values of the input voltage below zero volts.

FIGURE 18 illustrates the basic varistor network unit of our invention for developing an output voltage $e_0$ that varies as the cube of the input voltage $e_i$. For the varistor cubing unit we employ a plurality of varistors 140 in a stack so that they are connected in series, the varistors at the top and bottom of the stack having circuit leads 141, 142 connected thereto. The varistors 140, like the varistors 10 of FIGURE 3, may be in the form of discs obtained from an extruded rod of silicon carbide, sliced in the manner previously described. However, the varistors 140 differ from the varistors 10 in that they are characterized as current devices in which the current varies as the cube of the input voltage applied thereto. Referring to the nonlinear equation for the varistor $I = ke^n$, the varistors 140 form a stack wherein the exponent $n > 3.0$.

For the various reasons previously given in connection with the varistors 10, varistors in a given production run may be characterized by respective exponents that differ from 3.0. However, we have found that, as with a stack of varistors 10 as shown in FIGURE 3, the varistors 140 can be stacked and provided with a compensating resistive network, to develop an overall varistors network unit wherein the output voltage varies as the cube of the input voltage, i.e., the exponent $n$ of the varistor network as a whole is 3.0. To this end, the compensating resistive network is composed of a thermistor 143 and a variable resistor 144 connected in series to the lead 142.

The resistive network 143, 144 performs the same function as the resistive network 15–17 of FIGURE 3, i.e., to adjust the exponent $n$ of the network so that it is 3.0, and to provide means whereby a voltage can be extracted that varies directly as the current. In the same manner as the varistor squaring unit of FIGURE 3, a number of varistors 140 in the stack compensates for lack of uniformity in individual varistors, and provides optimum performance at the desired input voltage. Also, the varistors 140 are similarly arranged so that the semiconductive effects of the individual varistors are substantially nullified. The thermistor 143 performs the same function as the thermistor 16 of FIGURE 3, i.e., to compensate for the negative temperature coefficient of the varistors 140.

It has been found that, with the proper number of varistors 140, and the optimum resistance represented by the thermistor 143 and the variable resistor 144, an output voltage $e_0$ taken directly from the lead 142, as through an output lead 145, varies as the cube of the input voltage. It is preferable to take off the maximum voltage, as directly from the lead 142, because the maximum output of a varistor cubing unit is rather low, e.g., 2 volts for a full-scale input of 100 volts. By thus connecting the output lead 145, there is no need for the sliding contact of the squaring unit. However, the same arrangement of the resistors 15–17, and the sliding contact 19, could be used if desired. As with the varistor squaring unit, although this output voltage is small, it may be used directly for various purposes, such as the uses referred to in the description of the squaring unit of FIGURE 3.

When it is desired to employ the cubing network of FIGURE 18 to perform computer functions, the test circuit of FIGURE 6 is employed to obtain the correct number of varistors and to determine the proper compensating resistance to be connected thereto. To determine these parameters, the test circuit of FIGURE 6 is modified so that the output voltage from the amplifier 35 is again integrated, i.e., integration of a parabola results in an output voltage that represents the cube of the voltage in the output of the amplifier 32. Alternatively, of course, the additional stage of integration may be located between the integrators 32, 35, in which case the output of the integrator 35 represents the cube of the voltage from the amplifier 32. The additional stage of integration, of course, results in an additional inversion operation, so that the voltage excursions obtained are opposite in polarity to those obtained in the test circuit for the varistor squaring network.

If, as previously described in connection with FIGURE 6, the output of the amplifier 35 is of negative polarity, then the output of the triple-integrator system is positive. In such case, for summing purposes in the amplifier 69, it is necessary that the output of the varistor network under test be negative. In this manner, the amplifier 69 sums the positive output of the triple-integrator system and the negative output of the varistor network to obtain a presentation on the oscilloscope 85 of the percentage of error that the output of the varistor network exhibits with respect to the standard. To ensure that the voltage applied to the varistor network under test is of negative polarity, the amplifier 61 is removed, i.e., the switch 74 is connected directly to the output of the amplifier 58.

So far as the varistor cubing network is concerned, it has been found that specific characteristics of the error function do not serve as guides, to the same extent, as for the squaring unit. Instead, the procedure followed is to vary the number of varistors, and adjust the resistor 72, until all portions of the error function presented on the oscilloscope 85 are at a minimum. In FIGURE 19, the error function is represented by a curve 146 that is generally disposed below the x-axis of the scale, with one portion extending above the x-axis. When the varistor network has been optimized under conditons wherein the input voltage $e_i$ is 100 volts, it has been found that the maximum error of the output voltage $e_0$ relative to a true cube waveform is of the order of one-tenth of one percent, i.e., 0.1%.

FIGURE 20 illustrates a circuit wherein a varistor cubing network unit 147 is adapted to provide, for a maximum input voltage, an output voltage of the same magnitude. Referring to FIGURE 20, the varistor cubing network unit 147 has varistors $V_1, V_2, \ldots, V_n$, a thermistor 143, and variable resistor 144 all arranged as shown in FIGURE 18. However, the cubing unit is connected between the source of input voltage $e_i$ and the summing junction of a computing amplifier 148. The amplifier 148 contains a resistive feedback network that includes a variable resistor 149 and a thermistor 150, the total resistance of which is chosen to ensure a gain that results in an output voltage of the same magnitude as the input voltage at full-scale input. Preferably, the variable resistor 149 and the thermistor 150 are included in the same housing with the cubing unit, for the reason that the values of the resistor 149 and thermistor 150 are peculiar to each cubing unit.

In the circuit of FIGURE 20, the current that flows through the cubing unit 147 and feedback network varies as the cube of the input voltage. In the arrangement shown, the voltage available at the output lead 145 varies directly as the input voltage; however, reversal of the cubing unit results in the voltage available at the lead 145 varying as the cube of the input voltage. Thus, if it is desired to utilize a voltage appearing at the lead 145, one can obtain a voltage that varies linearly or as the cube of the input voltage, depending upon how the cubing unit is connected between the source $e_i$ and the summing junction of the amplifier 148.

In the circuit arrangement shown in FIGURE 20, the thermistor 143 of the cubing unit 147 does not perform its usual function. As has been indicated, the thermistor 143 is chosen so that voltage variations of the cubing unit on either side of the output lead 145 have the same negative temperature coefficient. However, since the output connection from the cubing unit 147 is from the lead 141, the entire unit functions as a variable-input resistance to the amplifier 148, with its own characteristic negative temperature coefficient. The thermistor 150 ensures that the feedback circuit has the same negative temperature coefficient as the cubing unit 147.

By using the cubing unit 147 as the input impedance for the amplifier 148, the circuit of FIGURE 20 makes it easier to develop an output voltage $e_0$ of the required magnitude, e.g., of 100 volts for full-scale input of 100 volts. To understand why this is so, it should be remembered that in the cubing unit shown in FIGURE 18, the output voltage $e_0$ at the lead 145 is of the order of only 2 volts when the input voltage $e_i$ is 100 volts, the actual magnitude depending upon the particular number of varistors and series compensating resistance needed in the optimized unit. Since the voltage available at the output lead 145 is different for different units, a sacrifice in voltage and dynamic range is necessary in order to make the voltage at the lead 145 of all cubing units the same. This would mean that if the lead were connected through a 0.2 megohm resistor to the input of an amplifier, such amplifier would have to have a feedback resistance of 10 megohms. The conventional computing amplifiers do not exhibit optimum efficiency when operated in this manner. However, by making the entire cubing unit 147 serve as the input resistance of the amplifier 148, this problem is eliminated.

To further understand the relationship between the feedback resistance across the amplifier 148 and the total resistance of the cubing unit 147, it is noted that $$e_0 = e_i \frac{R_f}{R_i}$$

where $R_f$=the feedback resistance composed of the thermistor 150 and the variable resistor 149, and $R_i$= the input resistance as represented by the cubing unit 147. Further $$R_i = \frac{e_i}{I}$$

where $I = k e_i^3$. From these relationships, it can be shown that $$e_0 = -k R_f e_i^3$$

As previously indicated, the output voltage from the varistor network shown in FIGURE 18 is quite small. An appreciation of the advantage of the use of the circuit in FIGURE 20 to develop an output voltage that varies as the cube of the input voltage can be obtained by examination of the following equation for the typical cubing unit of FIGURE 18 for a full-scale input of 100 volts:

$$e_0 = -2.2 \times 10^{-6} e_i^3$$

This means, of course, that if $e_i = 100$ volts, $e_0 = -2.2$ volts.

By way of contrast, the equation according to which the circuit of FIGURE 20 is as follows:

$$e_0 = -10^{-4} e_i^3$$

showng that, for an input voltage $e_i = 100$ volts, the output voltage $e_0 = -100$ volts.

Figure 22:
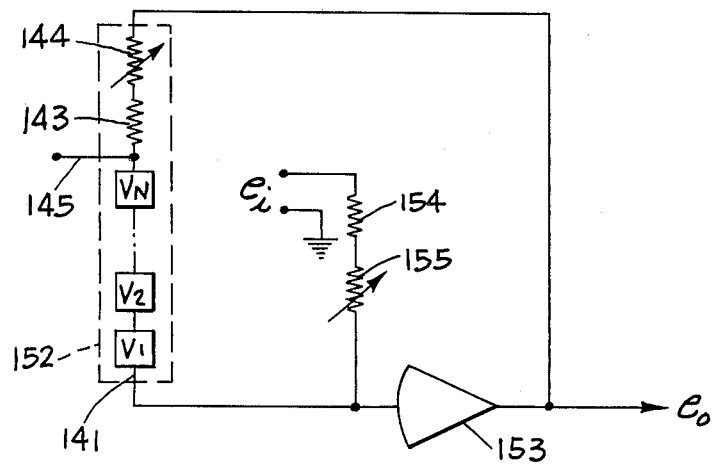
FIGURE 22 is a schematic diagram of a circuit of our invention employing our varistor cubing network to develop a voltage that varies as the cube root of an input voltage.

FIGURE 22 illustrates a circuit of our invention to develop a voltage that represents the cube root of an input voltage. In the circuit of FIGURE 22, a varistor cubing network unit 152 is connected in the feedback loop of a computing amplifier 153. An input voltage $e_i$ is applied through input resistors 154, 155 to the summing junction of the amplifier 153. In such arrangement, since a cubing unit responds to voltages applied thereto to develop a voltage varying as the cube of the input voltage, the cubing network unit 152 causes the feedback current to vary the gain of the amplifier so that a voltage $e_0$ appearing in the output of the amplifier 153 varies as the cube root of the input voltage $e_i$, i.e.

$$e_0 = -k \sqrt[3]{e_i}$$

Preferably, the fixed resistor 154 is a thermistor that has a negative temperature coefficient sufficient to balance, at the summing junction of the amplifier 153, the effect of the negative temperature coefficient exhibited by the varistor cubing network unit 152. The variable resistor 155 is provided for adjusting the input impedance at full-scale input to the proper value such that, in combination with the feedback resistance of the cubing unit 152, the output voltage is of the same magnitude as the input voltage.

The operation of the circuit of FIGURE 22 for a full-scale input of 100 volts, is represented by the equation $$e_0 = -k \sqrt[3]{e_i}$$

where the constant of proportionality has a value such that the product thereof with $$\sqrt[3]{e_i}$$ is 100 volts.

Figure 23:
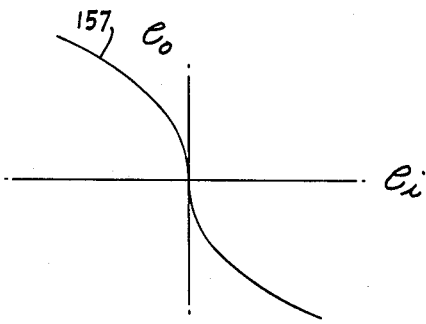
FIGURE 23 is a plot of the variations of the output voltage from the circuit of FIGURE 22 in response to variations in the input voltage, showing the cube function represented by such waveform as having symmetry about the origin.

The waveform 157 shown in FIGURE 23 represents the plot of the output voltage versus input voltage in the circuit of FIGURE 22, and will be seen to correspond to the cube root of the input voltage.

Figure 24:
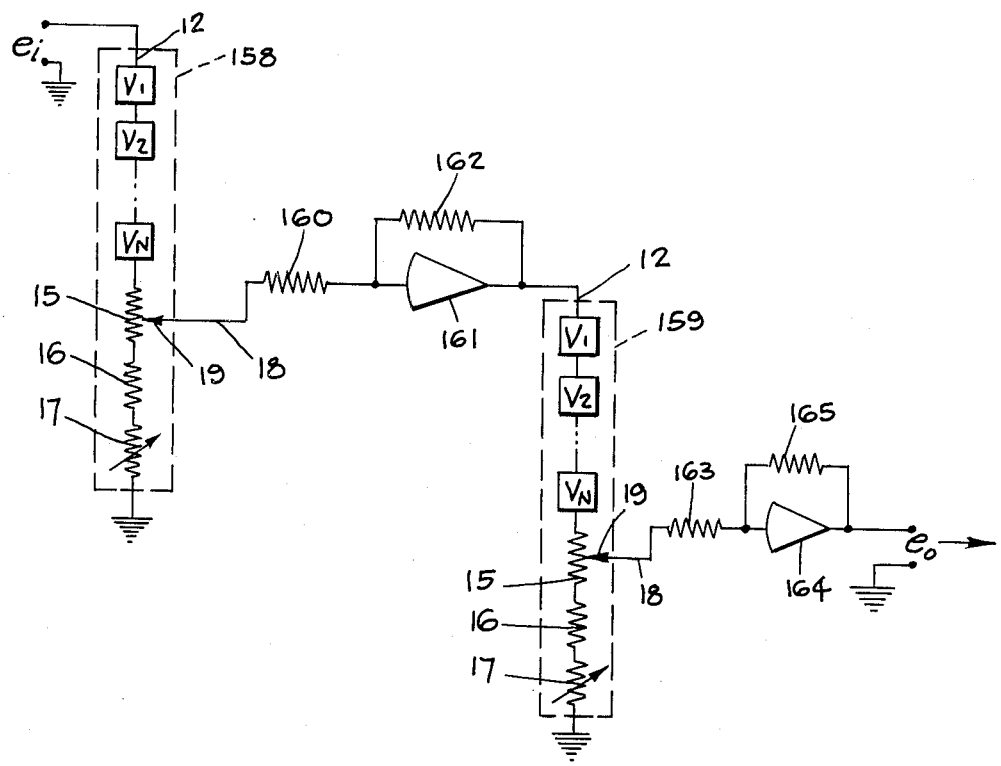
FIGURE 24 is a schematic diagram of a circuit of our invention employing a pair of our function generators for developing an output voltage that varies as the fourth power of an input voltage.

FIGURE 24 illustrates a circuit in accordance with our invention for developing an output voltage that varies as the fourth power of an input voltage. In this circuit, a pair of varistor squaring network units 158, 159 are employed. The output lead 18 of one of the varistor networks 158 is connected through an input resistor 160 to the computing amplifier 161 that has a resistive feedback, as represented by a resistor 162. The output of the amplifier 161 is connected to the squaring unit 159, which in turn has its sliding contact 19 connected through an input resistor 163 to a computing amplifier 164. As with the amplifier 161, the amplifier 164 is provided with a resistive feedback, indicated by a resistor 165.

For each of the amplifier arrangements in FIGURE 24, the ratio of the feedback and input resistors is such that the outputs of the amplifiers will be of the same magnitude as the input voltage at full-scale input. In operation, upon an input voltage $e_i$ being applied to the squaring unit 158, a voltage appears in the output of the computing amplifier 161 that represents the square of the input voltage $e_i$. The output voltage $e_0$ from the amplifier 164 also represents the square of the input voltage applied to the squaring unit 159, i.e., the square of the voltage in the output of the amplifier 161. Accordingly, since the square of a squared quantity is the fourth power of that quantity, the output voltage $e_0$ represents the fourth power of the input voltage $e_i$.

The equation for mathematically expressing the function generated by the circuit of FIGURE 24 is as follows:

$$e_0 = 0.01 \times 10^{-4} e_i^4 (\text{sgn } e_i)$$

Figure 25:
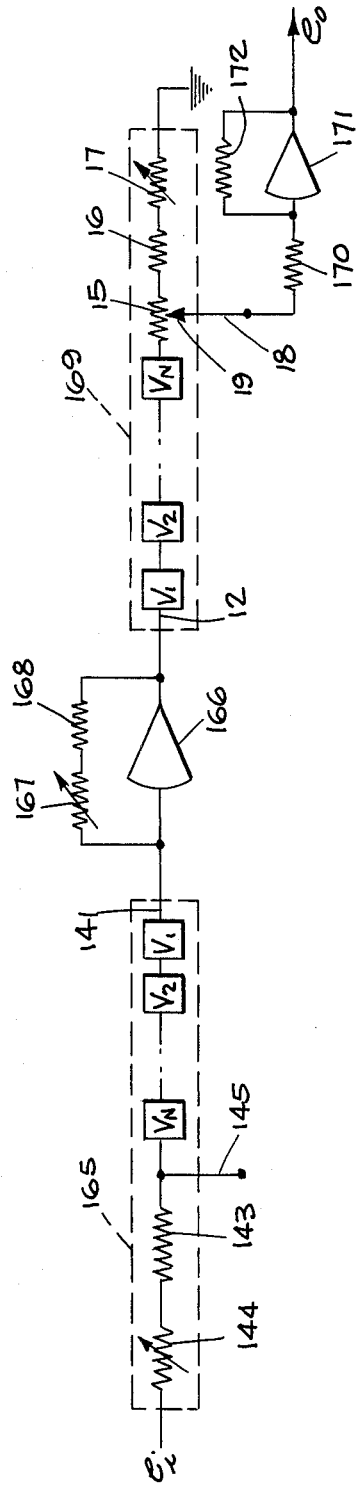
FIGURE 25 is a schematic diagram of a circuit of our invention employing a pair of function-generating units to develop a voltage that varies as the sixth power of an input voltage.

FIGURE 25 illustrates a circuit, in accordance with our invention, that employs varistor network units of the squaring and cubing types to develop a voltage that varies as the sixth power of the input voltage. To this end, we employ a varistor cubing unit 165 as the input impedance of a computing amplifier 166. The amplifier has a resistive feedback, composed of a variable resistor 167 and a thermistor 168. The thermistor 168 functions to provide the feedback resistance with the same negative temperature coefficient as that exhibited by the varistor cubing unit 165.

A varistor squaring unit 169 is provided in the output of the amplifier 166. A resistor 170 is connected between the output lead 18 of the squaring unit 169 and the input of a computing amplifier 171 having resistive feedback means 172.

Since the output of the amplifier 166 is a voltage that varies as the cube of the input voltage to the cubing unit 165, and since the varistor squaring network unit 169 provides at the sliding contact 19 a voltage that varies as the square of the input voltage thereto, the voltage in the output of the amplifier 171 is a voltage that varies as $$k(e_i^3)^2 = k e_i^6$$

From the foregoing, it will be apparent that our invention embraces various combinations of varistor squaring and cubing units to obtain any desired integral or non-integral power or root of an input voltage. For example, two varistor cubing units may be used in tandem to obtain an output voltage that varies as the ninth power of the input voltage. Or three varistor squaring units may be used in tandem to obtain an output voltage that varies as the eighth power of the input voltage. Or a voltage representing an integral power of another voltage may be applied to circuits incorporating a squaring or cubing unit adapted to provide the square root or cube root of the applied voltage. Thus, if a voltage representing the eighth power of another voltage, $e_i$, is applied to the circuit of FIGURE 22, the resultant output is $$e_0 = \sqrt[3]{e_i^8} = e_i^{8/3}$$

Figure 26:
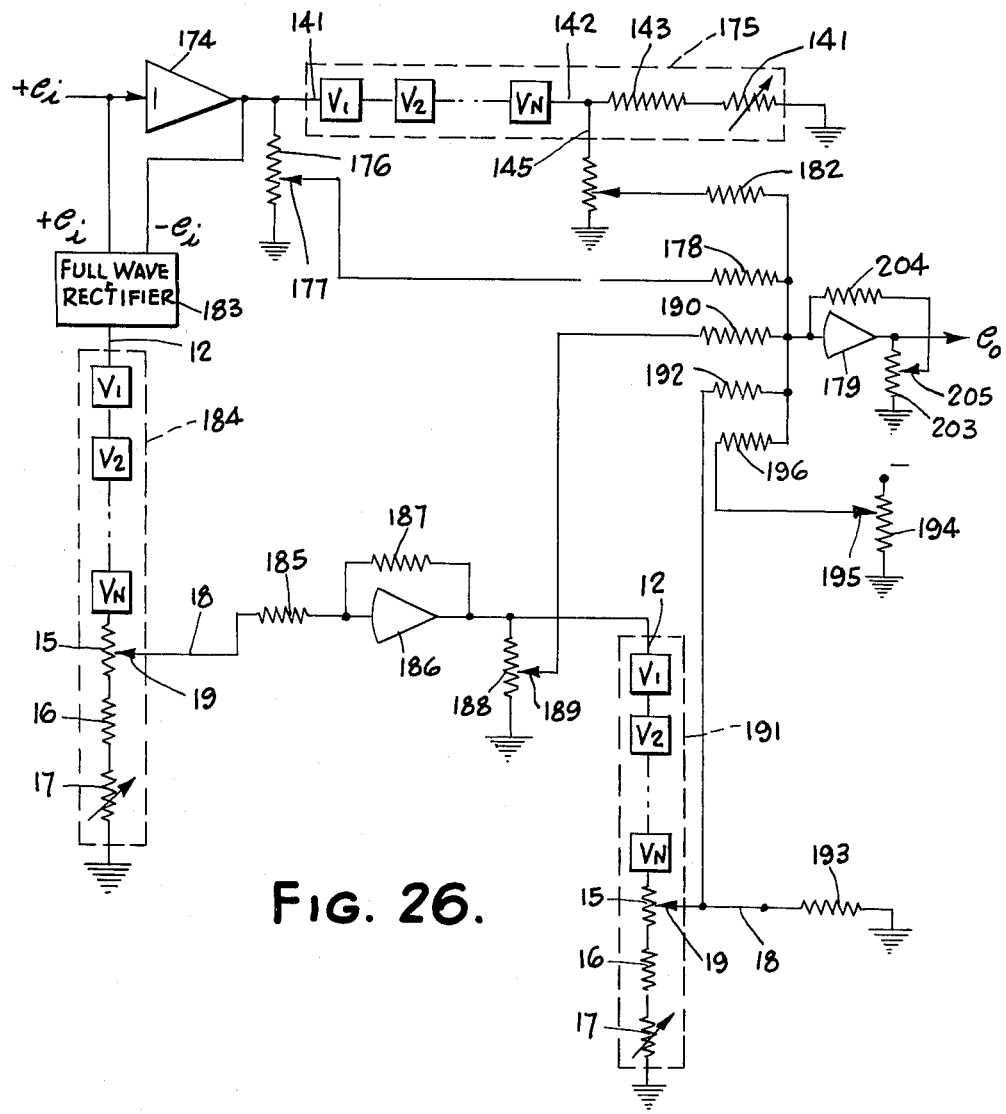
FIGURE 26 is a schematic diagram of a circuit of our invention employing a number of function-generating units to develop an output voltage from respective voltages corresponding to the terms of a truncated power series.

Our invention also embraces circuit means for developing and processing respective voltages that represent various terms in different mathematical expressions. For example, FIGURE 26 illustrates a circuit of our invention for obtaining an output voltage that corresponds to a power series representation of the function $e^x$, wherein the function is truncated so that only five terms thereof are employed. Pursuant to Maclaurin's theorem, the expression for the complete series is:

$$e^x = 1 + x + \frac{x^2}{2!} + \frac{x^3}{3!} + \ldots + \frac{x^{n-1}}{(n-1)!} + \ldots$$

The first five terms of this series contain coefficients as follows:

$$e^x = 1 + 1.000x + 0.5000x^2 + 0.1667x^3 + 0.0417x^4$$

If only five terms of this series function were employed in accordance with the mathematical derivation thereof, the solution would be found to be in error for values of $x$ in any particular range. However, it is well known that the coefficients can be altered, or "optimized" to provide a more accurate result. In the circuit of FIGURE 26, we develop and process voltages to develop an output voltage representing the value $e^x$ at the various powers as required in the first five terms of the series, but wherein these voltages are combined in accordance with the optimized coefficients.

To do this, we first determine, not only the number of terms of the series to use, but also the range of the independent variable. Then, in accordance with well-known mathematical techniques, we "redetermine" the coefficients needed in the various terms to arrive at a result that is more accurate than is obtained with the coefficients of the terms in the purely mathematical expression. The number of terms in the truncated series representation determines the number of points at which the error is to be zero. These may be defined as "match points," and they lead to a system of linear algebraic equations in which the coefficients are the unknowns.

For example, suppose the arbitrary function $f(x)$ is to be approximated by the expression:

$$f(x) = ax^r + bx^s + cx^t$$

for values of $x$ between two arbitrary limits. Let the points of zero error be denoted by $x_1$, $x_2$, and $x_3$. This gives rise to three equations in three unknowns, the unknowns being the coefficients. Solving these equations gives the values of the unknowns.

In similar fashion, where five terms of a series are to be used, such a procedure leads to a system of five equations in five unknowns, from which the five coefficients can be found. This procedure results in coefficients which can be said to optimize the portion of the series under examination. After the coefficients are found, the resulting approximation is used to calculate the function at a number of points within the specified range.

For the function $e^x$, it has been found that, for values of $x$ between $\pm 2$, assuming a full-scale input voltage $e_i$ available to be between $\pm 100$ volts, a truncated series representing $e^x$ to an accuracy of 0.42% is given in the following equation:

$$e^x = 1 + 0.9532x + 0.4847x^2 + 0.2151x^3 + 0.0515x^4$$

Referring to FIGURE 26, an input voltage $e_i$ is applied to a unity-gain amplifier 174 that has its output connected to the lead 141 of a varistor cubing network unit 175. The amplifier 174 has a potentiometer 176 conected at its output, the sliding contact 177 of the potentiometer being connected through a resistor 178 to the input of a summing amplifier 179. The lead 142 of the cubing unit 175 also has a potentiometer 180 connected thereto, the sliding contact 181 of such potentiometer being connected through a respective resistor 182 to the input of the amplifier 179.

The input voltage $e_i$, in both its positive and negative forms, is applied to a full-wave rectifier 183, to which a varistor squaring network unit 184 is connected. The sliding contact 19 and the output lead 18 of the squaring unit 184 are coupled to an input resistor 185 of a computing amplifier 186 that is provided with resistive feedback, as indicated at 187. A potentiometer 188 is connected in the output of the amplifier 186, and has its sliding contact 189 connected through a resistor 190 to the input of the amplifier 179.

The output of the amplifier 186 is also connected to the lead 12 of a varistor squaring network unit 191 that has its output lead 18 connected through a resistor 192 to the input of the amplifier 179. Also, a resistor 193 is connected between the output lead 18 and ground, such resistor having the same resistance as was employed in optimizing the squaring unit 191.

In the circuit of FIGURE 26 thus far described, it will be seen that the voltage picked off the potentiometer 177 varies linearly with the input voltage $e_i$. The voltage applied to the amplifier 179 through the potentiometer 180 varies as the cube of the input voltage. The output of the amplifier 186 varies as the square of the input voltage, and accordingly the voltage fed to the amplifier 179 through the potentiometer 188 varies as the square of the input voltage. The squaring unit 191 develops an output voltage that varies as the square of the output of the amplifier 186, i.e., the output voltage of the squaring unit 191 varies as the fourth power of the input voltage. Thus, in the circuit as described, voltages applied to the summing junction of the amplifier 179 are representative of the variable $x$ for the exponents 1–4, i.e., for the second, third, fourth, and fifth terms of the series.

The constant term of the series function $e^x$ is supplied by a potentiometer 194 that is connected to a source of constant voltage, e.g., the negative terminal of a 100-volt source. The sliding contact 195 of the potentiometer 194 is connected through a resistor 196 to the input of the amplifier 179.

To ensure that the five voltages applied to the input of the amplifier 179 are of the proper magnitude, so as to satisfy the coefficients of the terms of the optimized truncated series function, the various sliding contacts of the potentiometers are set to pick off portions of the voltages across the potentiometers such that their relative magnitudes correspond to the magnitudes of the redetermined coefficients.

Figure 27A:
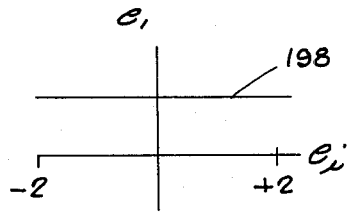
FIGURES 27a–27e are plots of the waveforms of the various voltages in the circuit of FIGURE 26 that correspond to respective terms of the series.
Figure 27B:
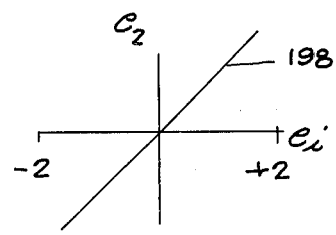
Figure 27C:
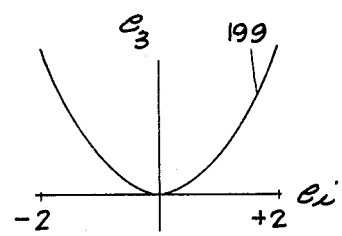
Figure 27D:
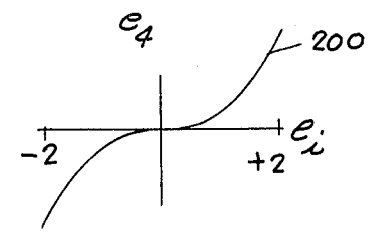
Figure 27E:
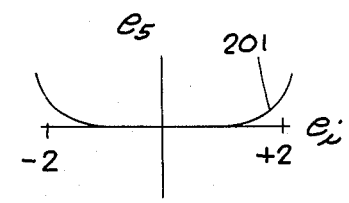

FIGURES 27a–27f illustrate waveforms obtained with an oscilloscope wherein the horizontal position of the beam is controlled by the input voltage, e.g., the voltage in the output of the amplifier 174. FIGURES 27a–27e illustrate, respectively, the output voltages obtained with only one of the aforementioned sliding contacts 195, 177, 189, 181, 18 connected to the amplifier 179. FIGURE 27a illustrates the constant level of the voltage picked off the potentiometer 194, as indicated at 197. FIGURE 27b illustrates the voltage 198 that is picked off the potentiometer 177. In FIGURE 27c, there is shown a curve 199 of the output voltage that varies as the square of the input voltage, i.e., the voltage picked off the potentiometer 188. FIGURE 27d illustrates the curve 200 of an output voltage that varies as the cube of the input voltage, which voltage is present in the circuit of FIGURE 26 across the potentiometer 180. And in FIGURE 27e, the waveform 201 shows the shape of an output voltage that varies as the fourth power of the input voltage, such voltage being available in the circuit of FIGURE 26 at the sliding contact 19 of the squaring unit 191.

Figure 27F:
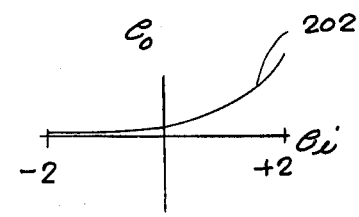
FIGURE 27f is a plot of the output voltage obtained with the circuit of FIGURE 26, and which is the sum of the various voltages illustrated in FIGURES 27a–27e.

FIGURE 27f illustrates a waveform 202 in the output of the amplifier 179 that results from the summation of the waveforms 197–201. As will be observed, the waveform 202 represents the plot of the series function $e^x$. As noted, the curve 202 shows a value for $e_0$ at $e_i=0$, which value is established by the voltage across the potentiometer 194, i.e., the voltage 197 illustrated in FIGURE 27a.

The amplifier 179 is provided with a potentiometer 203 in its output, and a feedback resistor 204 is connected between the input of the amplifier 179 and the sliding contact 205 of the potentiometer 203. With this arrangement, the sliding contact 205 is positioned to feed back a portion of the voltage across the potentiometer that causes the output voltage $e_0$ to have a value corresponding to the constant term (unity) in the series expressions.

Figure 28:
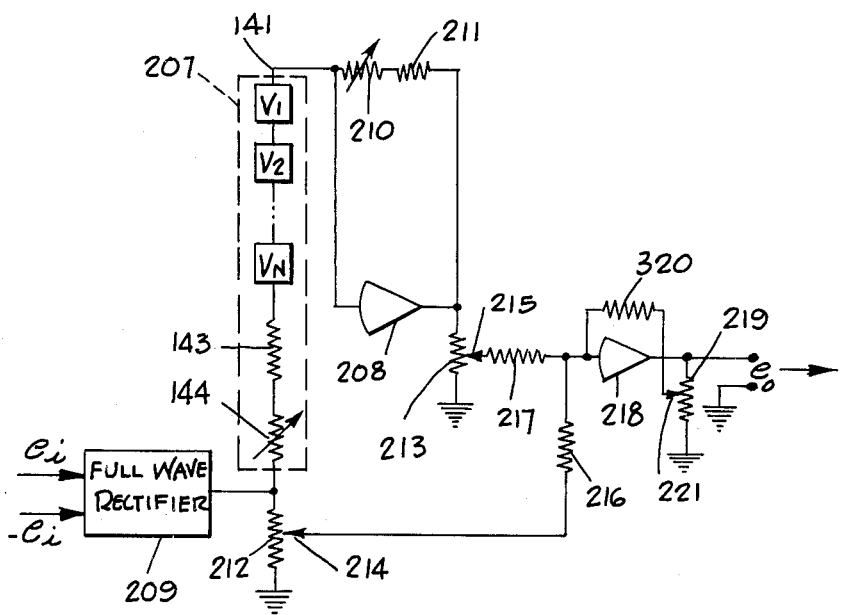
FIGURE 28 is a circuit diagram of our novel circuit employing varistor function-generating networks for developing an output voltage which varies as a truncated series representing the sine function of the input voltage.

FIGURE 28 illustrates the circuit of our invention for providing an output voltage that represents the truncated series function, sin $x$, for values of $x$ between $\pm \pi/2$. Referring to FIGURE 28, there is shown a varistor cubing network unit 207 that is connected to the input of a computing amplifier 208 and to which is supplied the input voltage $e_i$.

The amplifier 208 is provided with a resistive feedback, in the form of a variable resistor 210 and a thermistor 211. The thermistor 211 serves to provide a negative temperature coefficient for the feedback resistance to balance the effects of the negative temperature coefficient of the varistor cubing unit 207. This arrangement of the varistor cubing unit 207, and the amplifier 208 results in an output voltage from the amplifier 208 that varies as the cube of the input voltage.

Respective potentiometers 212, 213 are connected to the source of input voltage and to the output of the amplifier 208, and their sliding contacts 214, 215 are connected through respective resistors 216, 217 to the input of a computing amplifier 218. A potentiometer 219 is connected to the output of the amplifier 218, and a feedback resistance is provided by a resistor 220 that is connected between the input of the amplifier 218 and a sliding contact 221 on the potentiometer 219.

The circuit of FIGURE 28 is adapted to provide an output voltage $e_0$ that varies as the sine function of the input voltage, for a truncated series function of two terms. As is well known, such a truncated series is represented by the equation:

$$\sin x = x - \frac{x^3}{6}$$

However, the respective coefficients, 1,000 and 0.1667 for these terms are proper only when $x$ varies between narrow limits. For $x = \pm \pi/2$, the truncation error obtained through mathematical analysis is of the order of 8%. By way of contrast, the truncation error obtained with the circuit of FIGURE 28 is only 0.58 % for values of $x$ between $\pm \pi/2$.

Figure 29:
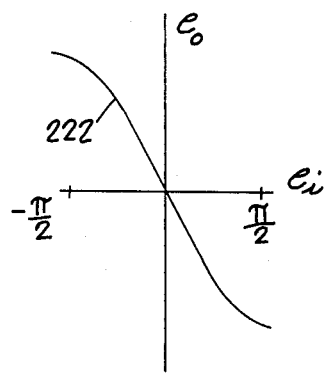
FIGURE 29 is a plot of the output voltage versus the input voltage for the circuit of FIGURE 28, showing how such output voltage has symmetry about the origin.

To obtain such a high degree of accuracy, the coefficients of the first two terms of the sine function are optimized, as in the manner previously explained. The mechanization of these coefficients is effected in the circuit of FIGURE 28 by properly setting the sliding contacts 214, 215 of the potentiometers 212, 213 so as to pick off voltages in the proportions that satisfy the optimized coefficients. In this manner, the voltages corresponding to $x$ and $x^3$ are fed to the amplifier 218 in the proper proportions, and the output voltage $e_0$ is found to vary, as indicated at 222 in FIGURE 29, in accordance with the equation $$e_0 = k \sin e_i$$

between the values $\pm \pi/2$, and with an error of only 0.58% of full-scale input.

Figure 30:
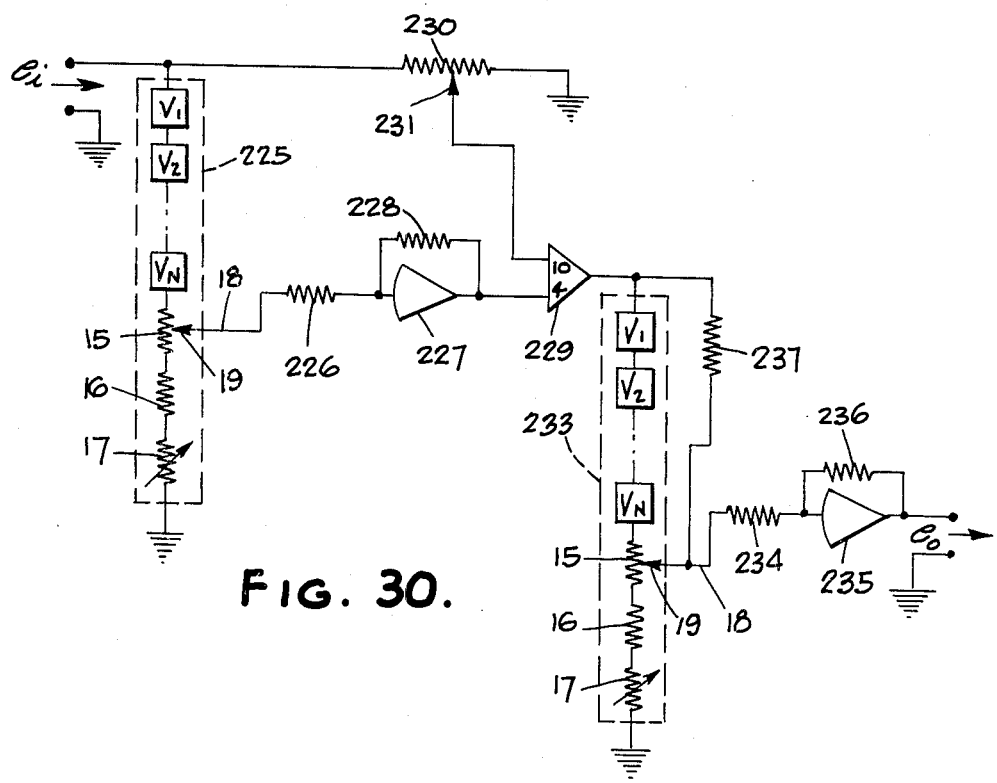
FIGURE 30 is a schematic diagram of another circuit of our invention utilizing function generators to develop an output voltage that varies as the sine function of an input voltage.

FIGURE 30 illustrates a unique circuit arrangement for developing an output voltage that varies as the sine of the input voltage, wherein the sine waveform desired is arrived at empirically, as by determining that the 1.14 power of the difference between the square and linear terms for a variable quantity results in a sine function. Regarding the circuit of FIGURE 30, this mechanization is effected by applying an input voltage $e_i$ to a varistor squaring network unit 225 that has its sliding contact 19 connected to an input resistor 226 of a computing amplifier 227 that has resistive feedback 228. The output of the amplifier 227 is applied to one channel of a computing amplifier 229 of the type having respective amplification channels. The input voltage $e_i$ is also applied across a potentiometer 230 that has its sliding contact 231 connected to another amplification channel of the amplifier 229. Preferably, the amplifier 229 amplifies the respective voltages from the amplifier 227 and the potentiometer 230 so that each appears in the output of the amplifier 229 at the same magnitude at full-scale input. For example, for an input voltage $e_i$ of 100 volts, the squaring unit 225 is adapted to develop at the sliding contact 19 a voltage of 20 volts that corresponds to the square of the input voltage, and the amplifier 227 raises this to 100 volts; simultaneously, 40 volts are picked off the potentiometer 230 and applied to the amplifier 229. The 100 volts appearing in the output of the amplifier 227 is subjected to a gain of four and the 40 volts picked off the potentiometer 230 is subjected to a gain of ten, whereby two voltages, each of a magnitude of 400 volts, appear at the output terminal of the amplifier 229. However, the voltage appearing in the output of the amplifier 227 is of opposite polarity to that appearing across the potentiometer 230. Therefore, for an input voltage $e_i=100$ volts, the output voltage from the amplifier 229 is zero.

For an input voltage less than full scale, the output of the amplifier 229 will vary, of course. The magnitude of the output voltage, and the polarity thereof, depends upon the relative magnitudes of the voltages applied to the input channels thereof. For example, an input voltage of 50 volts results, with the above settings, in 20 volts being applied to the amplifier 229 from the potentiometer 230, and a voltage of approximately 25 volts appears in the output of the amplifier 227. Accordingly, since the voltage in the output of the amplifier 227 is subjected to a gain of four, and the 20 volts is subjected to a gain of ten, the voltage in the output of the amplifier 229 is the difference between $20 \times 10 - 25 \times 4 = 100$ volts.

In terms of $e_i$, the voltage picked off the potentiometer 230 is directly related to $e_i$, and the voltage in the output of the amplifier 227 is related as the square of $e_i$. Since the voltage in the output of the amplifier 227 is of opposite polarity with respect to the voltage across the potentiomeer 230, it will be seen that the amplifier 229 sums voltage quantities $ke_i$ and $e_i^2$ sgn $e_i$, i.e., the voltage appearing in the output of the amplifier 229 varies as $ke_i - e_i^2$ sgn $e_i$.

The output of the amplifier 229 is applied to a varistor squaring network unit 233, which has its output lead 18 connected through a resistor 234 to a computing amplifier 235, across which is a feedback resistor 236. The squaring unit 233 functions in the normal manner; however, the voltage applied to the amplifier 235 does not represent the square of the applied voltage, but rather as such voltage raised to the 1.14 power. This is accomplished by means of a linear resistance between the sliding contact 19 and the input of the squaring unit 233, as by a resistor 237. This resistive connection performs a unique function in that it effects a lowering of the exponent that normally characterizes the operation of the varistor squaring unit.

We have discovered that such a resistive connection can be provided to cause the output voltage from the varistor network to correspond to some power less than the square. In this instance, the value of the resistor 237 is such that the output voltage from the squaring unit 233 varies as the 1.14 power of the input voltage. The ratio of the resistances of the resistors 236, 234 is such that the output of the amplifier 235 at full-scale input is equal to the input voltage. For an input voltage corresponding to $\pm \pi$ at full-scale input (e.g., $\pm 100$ volts), the voltage in the output of the amplifier 235 varies as $$e_0 = (e_i^2 \text{ sgn } e_i - \pi e_i)^{1.14}$$

Figure 31:
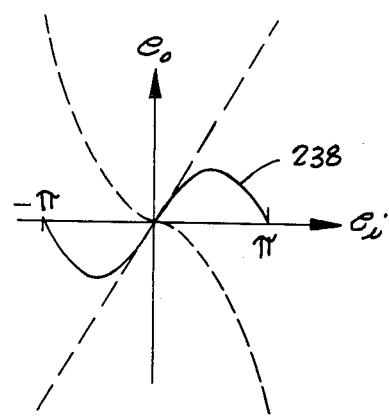
FIGURE 31 is a plot of the output voltage versus the input voltage for the circuit of FIGURE 30, to aid in explaining how the respective positive and negative halves of the sine wave are obtained.

Referring to FIGURE 31, the sine waveform 238 illustrated represents the variation in the output voltage $e_0$ from the circuit of FIGURE 30, and is obtained by summing the linear and squared voltages, and raising the difference to the 1.14 power to obtain a substantially true sinusoid. The waveform 238, as plotted for values of $e_i$ between $\pm \pi$, has been found to vary by only 0.5% from a true sine function.

Figure 32:
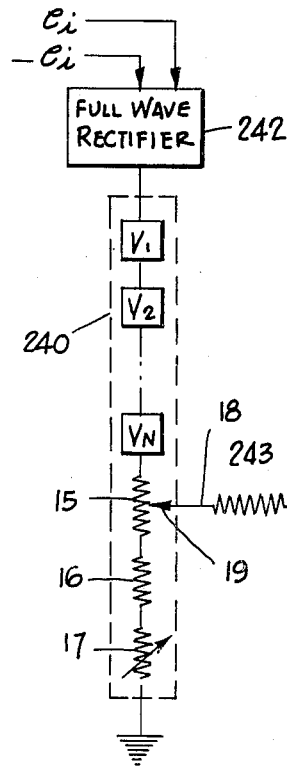
FIGURE 32 is a schematic diagram of a novel circuit employing a pair of varistor squaring networks for developing an output voltage that varies as a truncated series representing the cosine function of the input voltage.

FIGURE 32 illustrates a circuit of our invention for generating a voltage that varies as the cosine of an input voltage, where the series function is truncated at the third term of the series. From the portion of the Maclaurin series, $$\cos x = 1 - \frac{x^2}{2!} \frac{x^4}{4!}$$

the coefficients are optimized to arrive at the following equation:

$$\cos x = 1 - 0.4965 x^2 + 0.0370 x^4$$

In the circuit of FIGURE 32, the mechanization of the optimized truncated series is effected through a pair of varistor squaring network units 240, 241, wherein the squaring unit 240 has applied thereto the absolute value of an input voltage $e_i$. To this end, a full-wave rectifier 242 has the positive and negative values of the input voltage applied thereto. Thus, the voltage at the sliding contact 19 corresponds to the square of the absolute value of the input voltage. The sliding contact 19 is connected to an input resistor 243 of a computing amplifier 244 of the resistive feedback type, as indicated by a resistor 245, that provides sufficient gain so that the amplifier 244 develops a voltage equal in magnitude to the input voltage at the peak value thereof. In this circuit, the peak value of the input voltage is chosen to correspond to $\pm \pi/2$.

The output voltage of the amplifier 244 is applied across a potentiometer 245 and to the squaring unit 241. The sliding contact 19 of the unit 241 is fed through a unity-gain amplifier 247, to appear in inverted form in the output thereof. The output of the amplifier 247 is connected across a potentiometer 248, the sliding contact 249 of which is connected through a resistor 250 to the input of a computing amplifier 251.

The sliding contact 252 of the potentiometer 245 in the output of the amplifier 244 is connected through a resistor 253 that is also connected to the input of the amplifier 251. Thus, since the output of the amplifier 244 is the square of the input voltage $e_i$, and the output of the squaring unit 241 is the square of such squared voltage, i.e., the fourth power thereof, these voltages represent the variable of the second and third terms of the series. The constant term of the series is supplied by means of a potentiometer 254 that is connected to a source of constant voltage, such potentiometer having its sliding contact 255 connected through a resistor 256 to the input of the amplifier 251. Thus, voltages representing the constant and the variable in the second and third terms of the cosine series function are all combined in a resistance summing network comprising resistors 250, 253, and 256. The amplifier 251 has a resistive feedback, and to this end is provided with a potentiometer 257 connected to its output, and a fixed resistor 258 connected between the input of the amplifier 251 and the sliding contact 259 of the potentiometer 257.

Figure 33:
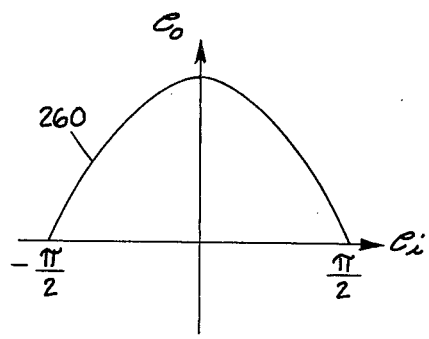
FIGURE 33 is a plot of the output voltage versus the input voltage for the circuit of FIGURE 32, showing the output voltage to have y-axis symmetry.

The setting of the sliding contact 259 is such as to provide an output voltage of zero volts when the input voltage is at full scale. The sliding contacts of the potentiometers 245, 248, and 254 are positioned so that the portions of the voltages thereacross are fed to the amplifier 251 in the relative proportions to satisfy the coefficients of the optimized truncated series function. In this manner, there is developed an output voltage having a waveform 260 (see FIGURE 33) that varies as cos $e_i$ between values of $e_i$ corresponding to $\pm \pi/2$. The waveform 260 is in error by only 0.1% from a true cosine function in the range between $\pm \pi/2$.

FIGURE 34 illustrates a circuit in accordance with our invention for developing respective output voltages representing the truncated series functions cos $x$ and $e^{-x^2}$, depending upon combinations of different voltages generated therein. Referring to FIGURE 34, we employ a varistor squaring network unit 261 in conjunction with a computing amplifier 262 for developing an output voltage that varies in accordance with the square of the absolute value of an input voltage $e_i$. Such absolute value of the input voltage is developed in the output of a full-wave rectifier 263 to which respective voltages $e_1$ of opposite polarities are applied. The output of the squaring unit 261 is fed through a resistor 264 to the amplifier 262, which has a feedback resistor 265 connected thereacross. A potentiometer 266 has its sliding contact 267 connected through a resistor 268 to the input of a summing amplifier 269.

The output of the amplifier 262 is also connected to respective varistor networks 270, 271 that develop output voltages corresponding, respectively, to the square and to the cube of the voltage in the output of the amplifier 262. As shown, the output of the cubing unit 271 is connected across a potentiometer 272, the sliding contact 273 of which is connected through a resistor 274 to the amplifier 269. The output of the squaring unit 270 is connected through a resistor 275 to a computing amplifier 276 having resistive feedback 277. A potentiometer 278 is connected to the output of the amplifier 276, and its sliding contact 279 is connected through a resistor 280 to the amplifier 269.

As will be apparent, the resistors 268, 274, 279 are part of a resistive summing network. Such summing network also includes a resistor 281 that is connected to the sliding contact 282 of a potentiometer 283 that is connected to a source of constant voltage.

The feedback network of the amplifier 269 includes a potentiometer 284 connected to the output of the amplifier, and a resistor 285 connected between the input of the amplifier and the sliding contact 286 of the potentiometer 284. Thus, there is applied to the input of the amplifier 269 the sum of four voltages: a constant voltage from the potentiometer 283; a voltage from the potentiometer 266 that represents the square of the input voltage $e_i$; a voltage from the potentiometer 278 that represents the fourth power of the input voltage; and a voltage from the potentiometer 272 that represents the cube of the square of the input voltage, i.e., the sixth power of the input voltage.

A constant term, and respective terms representing the square, the fourth power, and the sixth power of a variable (and note that the voltages representing the square and the sixth power are of opposite sign to the voltage representing the fourth power) are the terms that are found in the series for both $\cos x$ and $e^{-x^2}$. The coefficients for the terms including the variable are, of course, different in the respective series.

In accordance with our invention, the sliding contacts of the various potentiometers in the circuit of FIGURE 34 are positioned so as to feed voltages to the input of the amplifier 269 in the proper proportions needed to provide the electrical equivalents of the coefficients. Such coefficients are not those found in the purely mathematical expression of the respective series functions; instead, the truncated series using four terms is analyzed, and the coefficients are redetermined to obtain a result for the four terms that has better accuracy than can be obtained by using the coefficients of the purely mathematical expression of the series. In such redetermination of the coefficients, it has been found that the equation that gives more accurate results for a cosine series function, wherein the variable may range between $\pm \pi$ is as follows:

$$\cos x = 1 - 0.4967x^2 + 0.0394x^4 - 0.0010x^6$$

and that a more accurate result is obtained for the series function $e^{-x^2}$, where the variable may range between $\pm 2$, in accordance with the equation:

$$e^{-x^2} = 1 - 0.9634x^2 + 0.3868x^4 - 0.0602x^6$$

For the truncated cosine series function having coefficients redetermined as shown, the circuit of FIGURE 34 provides an output voltage that has a maximum error of 0.22% of full scale of 100 volts. For the series function $e^{-x^2}$, the maximum error for an input voltage of 100 volts full scale is of the order of 0.5%.

In the manner previously described in connection with FIGURE 32, settings are made for the various potentiometers in the circuit of FIGURE 34 so that the voltages summed at the input of the amplifier 269 are available in the proper proportions corresponding to the coefficients calculated for the minimum truncation error in the desired range. FIGURE 35 illustrates the waveform 287 obtained for the settings of the potentiometers wherein the output voltage varies as the cosine of the input voltage, and wherein peak values of the input voltage of $\pm 100$ volts correspond to $\pm \pi$. With the desired settings obtained for the various potentiometers, the sliding contact 286 of the potentiometer 284 in the output of the amplifier 269 is varied so that, at $e_i$ equals zero volts, the output voltage $e_0$ is 100 volts.

FIGURE 36 illustrates the waveform 288 of the output voltage $e_0$ that corresponds to the probability function $e^{-x^2}$ wherein the input voltage is variable between upper and lower limits corresponding to $\pm 2$. The coefficients for the terms including the variable for the series $e^{-x^2}$ are larger than those for the corresponding terms of the cosine series function, and the sliding contacts of the various potentiometers in the circuit of FIGURE 34 are correspondingly set to feed larger voltages to the input of the amplifier 269.

FIGURE 37 illustrates a novel circuit arrangement for generating respective voltages that vary as the cosine function and as the square of the sine function of the input voltage. Referring to FIGURE 37, positive and negative values of the input voltage $e_i$ are applied to a full-wave rectifier 290 to develop a voltage corresponding to the absolute value of the input voltage. The output of the rectifier 290 is applied to a varistor squaring network 291 to develop a voltage that varies as the square of the input voltage.

The voltage in the output of the squaring unit 291 is amplified through a computing amplifier 292 which, through input and feedback resistors 293, 294, provides an output of zero volts at the peak value of the input voltage. The output of the amplifier, as shown, is fed to one amplifying channel of a dual-channel amplifier 295. The output of the rectifier 290 is applied across a potentiometer 296, the sliding contact 297 of which is coupled to the other amplifying channel of the amplifier 295. The amplification in the respective chanenls of the amplifier 295 is such that, at the peak value of the input voltage, the respective voltages applied to the amplifier 295 appear in the output thereof at the same magnitude. This means that the squared voltage from the squaring unit is summed in the output of the amplifier 295 with the corresponding input voltage.

Referring to FIGURE 38a, there is shown a dotted waveform 296 of the sum of the voltage developed by the squaring unit 291 and the input voltage, i.e., the voltage in the output of the amplifier 295. As shown in FIGURE 38a, the waveform 296 is parabolic in shape and the portions thereof are of the same polarity for both positive and negative values of the input voltage. As will be seen by inspection, the points at which the voltage 296 is zero are those corresponding to $e_i = 0, \pi, -\pi$. The peaks of the waveform 296 are centered with respect to the values of the input voltage that correspond to $\pm \pi/2$.

It has been found that by taking the difference between the square of the input voltage and the input voltage, i.e., the voltage 296, raising this quantity to the 1.14 power, and then squaring, the parabolic approximation to the sine wave (waveform 296 in FIGURE 38a) is converted to a sine waveform 297 (see FIGURE 38b) which, compared with a true sine wave of the same magnitude, has zero error at nine points, i.e., in addition to the points 0, $\pm\pi/2$, and $\pm\pi$ at which the waveform 296 has zero error with a standard sine wave, this operation results in the waveform 297 also having zero error at the points $\pm\pi/4$ and $\pm 3\pi/4$.

The mechanization whereby the difference between the square of the input voltage and the input voltage is raised to this nonlinear power is effected by means of a varistor squaring unit 300 connected to the output of the amplifier 295, and wherein resistive connection 301 is provided between the sliding contact 19 and the input of the squaring unit 300. The resistor 301 functions to lower the exponent that characterizes the operation of the squaring unit 300, so that the output thereof is a voltage varying as the 1.14 power of the applied voltage.

The voltage 302 (FIGURE 38a) in the output of the squaring unit 300 is fed through a resistor 303 to an amplifier 304 that develops an amplified version of the voltage 302 such that the magnitude of the voltage 302 is equal to the peak magnitude of the input voltage at points at which the input voltage corresponds to $\pm\pi/2$. Squaring the waveform 302 results in the waveform 297, wherein the cusp of the waveform 302 is removed and rounded off. The squaring is effected by means of a varistor squaring unit 305 connected in the output of the amplifier 304. The voltage in the output of the squaring unit 305 is amplified, and for this purpose is fed through a resistor 306 to a computing amplifier 307 having resistive feedback 208. An output voltage $e_1$ taken directly from the output of the amplifier 307 has the waveform 297 shown in FIGURE 38b.

To obtain an outut voltage that varies as the cosine function of the input voltage, our circuit incorporates a source of constant voltage 309 connected to the output of the amplifier 307. The voltage of the source 309 causes the voltage appearing in the output of the amplifier 307 to be lowered by a constant value, so that a voltage $e_2$ coupled to the source 309 has the waveform, indicated at 310 in FIGURE 38c, of the cosine function.

To aid in understanding the operation of the circuit of FIGURE 37 for developing the output voltage that varies as the cosine function of the input voltage, it will be noted in FIGURE 38b that if a line 311 is drawn horizontally through the center of the curve 297, and such line 311 were made a reference for such waveform, the waveform would represent the cosine function. What is accomplished in the circuit of our invention is the translation of the waveform 297 to a new reference (see FIGURE 38c) and it is the voltage source 309 that accomplishes this function. As indicated in FIGURE 38c, the waveform 310 for the cosine function illustrates the output voltage $e_2$ obtained between limits of the input voltage corresponding to $\pm 2\pi$.

Figure 39:
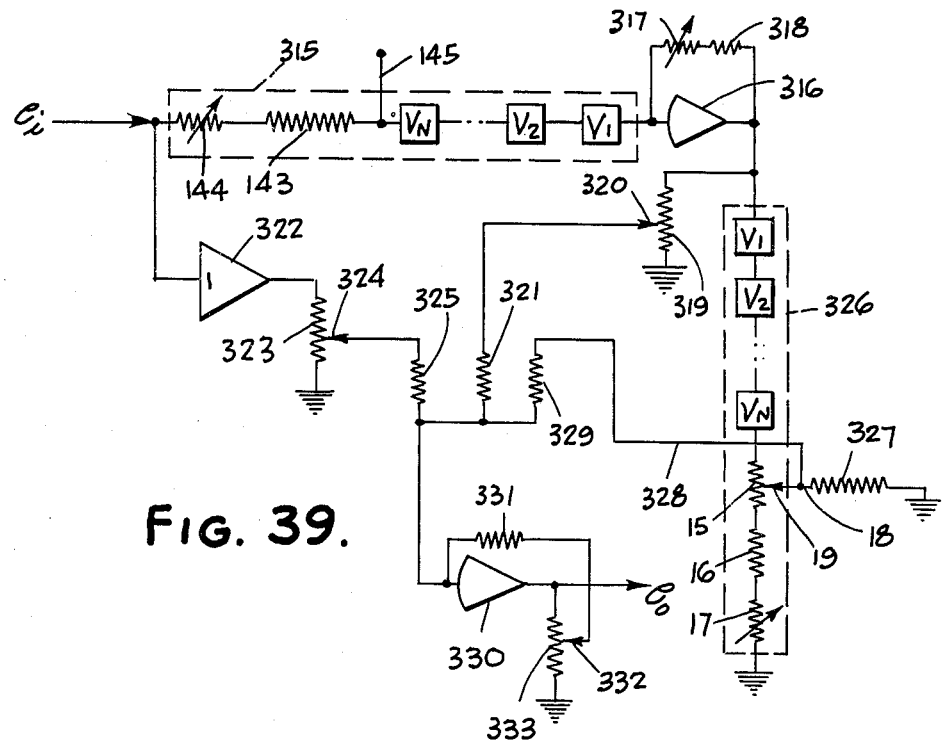
FIGURE 39 is a schematic diagram of a circuit of our invention employing our function generator units to develop, for respective settings of various potentiometers, voltages which vary as truncated series representing the tangent and hyperbolic sine functions of an input voltage.

FIGURE 39 illustrates a unique circuit in accordance with our invention for developing respective output voltages that vary either as the tangent or the hyperbolic sine of the input voltage, depending upon how voltages generated therein are combined. Referring to FIGURE 39, an input voltage $e_1$ is applied to a varistor cubing unit 315 that forms the input resistance of a computing amplifier 316. The amplifier 316 has a resistive feedback comprising a variable resistor 217 and a thermistor 318. The thermistor 318 is of such a value that the voltage fed back across the amplifier 316 traverses a linear resistance circuit that has the same negative temperature coefficient as that exhibited by the cubing unit 147. The operation of the network employing the varistor cubing unit 315 in the input of the amplifier 316 results in a voltage in the output of the amplifier 316 that varies as the cube of the input voltage $e_1$.

A potentiometer 319 is connected in the output of the amplifier 316, and has its sliding contact 320 connected to a summing resistor 321. The input voltage $e_1$ is also applied through a unity-gain amplifier 322 to appear across a potentiometer 323 in inverted form. The sliding contact 324 of the potentiometer 323 is connected to a summing resistor 325.

The output of the amplifier 316 is also applied to a varistor squaring network unit 326 that has its sliding contact 19 connected to a summing resistor 329. As shown, the summing resistors 321, 325 and 329 are all connected to the input of a computing amplifier 330 having resistor feedback. Such resistive feedback comprises a resistor 331 connected between the input of the amplifier 330 and the sliding contact 332 of a potentiometer 333 that is coupled to the output of the amplifier 330.

In the circuit of FIGURE 39, a voltage appears in the output of the amplifier 322 that varies directly as the input voltage $e_1$; a voltage appears in the output of the amplifier 316 that varies as the cube of the input voltage; and, since the squaring unit 326 operates to develop an output voltage varying as the square of the voltage applied thereto, an output voltage appears at the lead 18 that varies as the sixth power of the input voltage. Thus, voltages corresponding to the first, third, and sixth powers are summed at the input of the amplifier 330.

It will be recognized, upon examination of the series functions for the tangent and hyperbolic sine, that the variable appears only in odd powers, i.e., $x$, $x^3$, $x^5$, $x^7$, .... However, we have discovered that we can combine voltages corresponding to the first, third, and sixth powers of the variable, and arrive at a series of three terms that represents the tangent and hyperbolic sine functions substantially as accurately as could be obtained using a truncated series of four terms. Considering the Maclaurin series for tangent $x$, the equation is:

$$\tan x = x + \frac{x^3}{3} + \frac{2x^5}{15} + \frac{17x^7}{315} + \cdots$$

In analyzing circuit means for combining squaring and cubing units in such a manner as to avoid having to derive voltages that vary as the fifth, seventh, and other odd powers of the variable, we have discovered that, for a range of the variable between $\pm\pi/3$, we can replace the terms including the fifth and seventh powers of the variable with the sixth power, taken in conjunction with its signum function, and with coefficients optimized as in the following equation:

$$\tan x = 1.102x + 0.3014x^3 + 0.2487x^6 (\text{sgn } x)$$

The circuit of FIGURE 39 processes voltages in accordance with the foregoing equation, wherein the input voltage $e_1$ is substituted for the variable $x$. The first term is represented by the voltage picked off the potentiometer 323, and the second term is represented by the voltage picked off the potentiometer 319. Since the voltage appearing in the output of the amplifier 322 is opposite in sign to the voltage applied to the cubing unit 315, the inversion effected by the amplifier 316 ensures the combination of the respective voltages from the potentiometers 319, 323 with the same polarity, i.e., the same sign.

Figure 40:
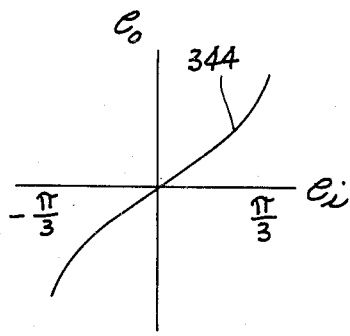
FIGURE 40 is a plot of output voltage versus input voltage for the settings of the potentiometers of the circuit of FIGURE 39 in which the output voltage varies as the tangent of the input voltage.

The third term of the foregoing expression is satisfied by the squaring unit 326. The significance of the "sgn $x$" factor is that the output voltage from the unit 326 assumes the same sign as the voltages applied to the summing resistors 325, 321. Referring to FIGURE 40, there is shown an output voltage waveform 334, corresponding to tan $e_1$ for valves of $e_1$ between upper and lower limits corresponding to $\pm\pi/3$. To obtain this output waveform, the sliding contacts of the potentiometers 319 and 323 are chosen so that, in conjunction with the voltage on the output lead 18 of the squaring unit 326, voltages in the proper proportions to satisfy the foregoing expression are applied to the input of the amplifier 330. In one example, it has been found that for upper and lower limits of the voltage $e_1$ of 100 volts, corresponding to $\pm\pi/3$, the maximum error of the curve 334 was 0.16% of full-scale voltage.

Figure 41:
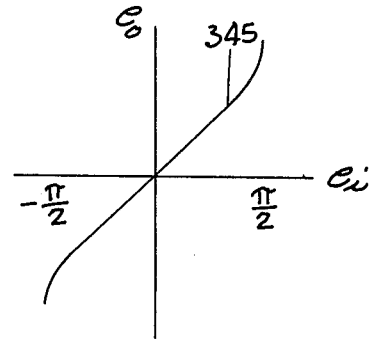
FIGURE 41 is a plot of output voltage versus input voltage for the settings of the potentiometers of the circuit of FIGURE 39 in which the output voltage varies as the hyperbolic sine of the input voltage.

FIGURE 41 illustrates the waveform 335 of the output voltage obtained from the circuit of FIGURE 39 for settings of the sliding contacts of the potentiometers for effecting the summation of voltages in accordance with the following optimized equation:

$$\sinh x = 0.9985x + 0.1730x^3 + 0.0042x^6 (\text{sgn } x)$$

For thus obtaining the plot of an output voltage waveform that varies as the hyperbolic sine of the input voltage, it has been found that the curve 335 has a peak error of 0.22% of full scale input corresponding to $\pm \pi/2$.

In the circuit of FIGURE 39, the sliding contact 332 of the potentiometer 333 in the output of the amplifier 330 is set for a desired output voltage, and particularly so that $e_0$ is a desired value at peak input. For example, since it is known that the tangent of $\pi/3$ is 1.732, the sliding contact 332 can be set so as to provide an output voltage corresponding to some known fraction of the tangent, e.g., $e_0 = 86.6$ volts at maximum input voltage, corresponding to 0.866, or one-half of tan $\pi/3$. Thereafter, all that is necesary is to double the output readings and relate them directly to the decimal equivalents for the tangents of various angles.

Figure 42:
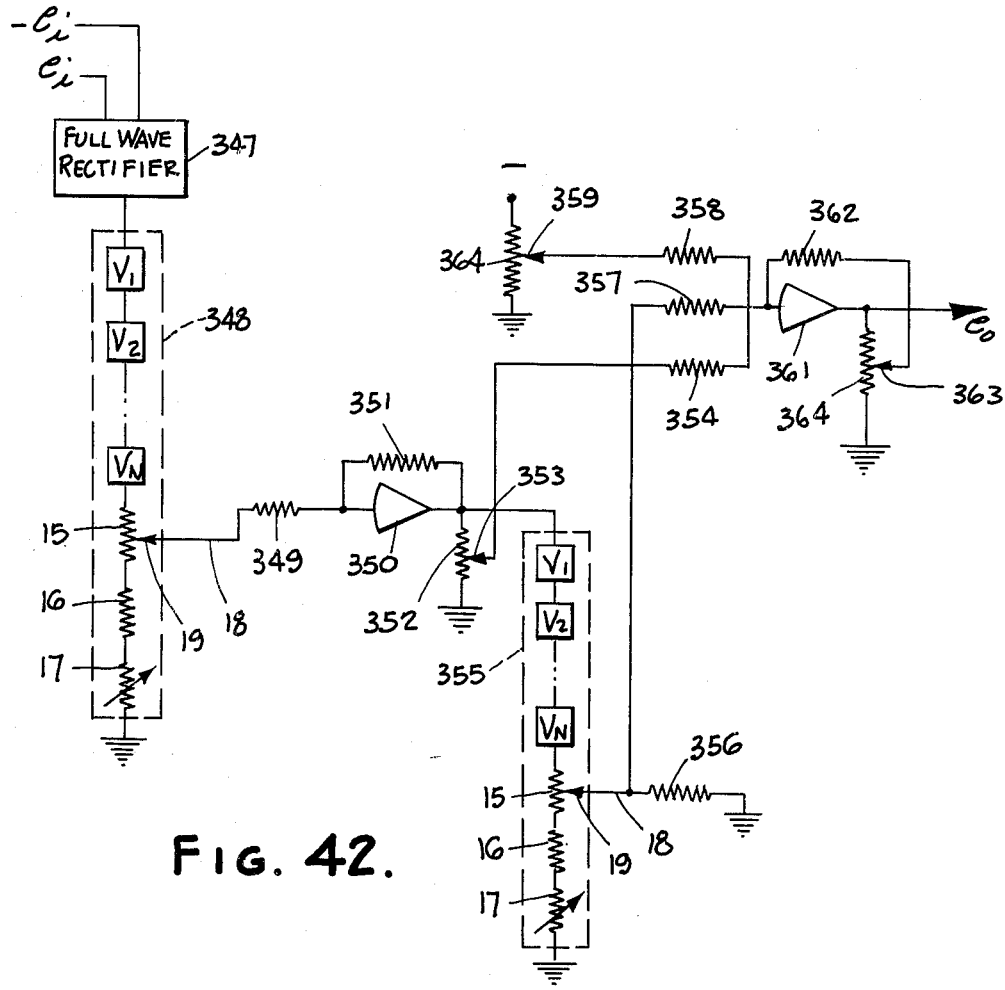
FIGURE 42 is a schematic diagram of a circuit employing varistor squaring networks for developing an output voltage that varies as a truncated series representing the hyperbolic cosine of an input voltage.

FIGURE 42 illustrates a circuit of our invention for generating output voltages that vary as the hyperbolic cosine of the input voltage, wherein the series is truncated at the third term. Referring to FIGURE 42, positive and negative values of the input voltage $e_1$ are applied to a full-wave rectifier 347 to develop a voltage corresponding to the absolute value of the input voltage. The output of the rectifier 347 is applied to a varistor squaring network unit 348 that develops an output voltage corresponding to the square of the input voltage. The output of the squaring unit 348 is applied through a resistor 349 to the input of a computing amplifier 350 having resistive feedback, as indicated by a resistor 351. The voltage in the output of the amplifier 350 is applied across a potentiometer 352, the sliding contact 353 of which is connected to a summing resistor 354.

The output of the amplifier 350 is also applied to a varistor squaring network unit 355 to develop a voltage corresponding to the square of $e_i^2$, i.e., corresponding to $e_i^4$. The sliding contact 19 of the squaring unit 355 is connected to a ground resistor 356, and also to a summing resistor 357. Another summing resistor 358 is provided that is connected to the sliding contact 359 of a potentiometer 360 that is connected to a source of constant voltage.

The summing resistors 354, 357 and 358 are all connected to the input of a computing amplifier 361. Accordingly, there is summed at the input of the amplifier 361 a constant voltage from the potentiometer 360, and respective voltages from the squaring units 348, 355 corresponding to the square and to the fourth power of the input voltage.

The coefficients for the first three terms of the truncated hyperbolic cosine function are redetermined, so as to obtain optimized coefficients that most closely approximate the hyperbolic cosine function for values of the variable between $\pm 3$. The sliding contacts of the various potentiometers are then set so that the constant voltage and the voltages representing the second and fourth powers of the input voltage are applied to the input of the amplifier 361 in the proper proportions.

Figure 43:
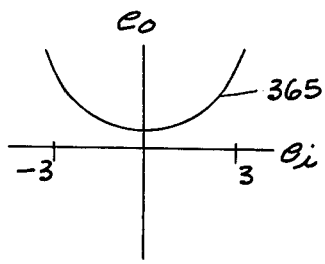
FIGURE 43 is a plot of the output voltage versus the input voltage for the circuit of FIGURE 42.

As shown, the amplifier 361 has a feedback resistor 362 connected between its input and the sliding contact 363 on a potentiometer 364 that is coupled to the amplifier output. The sliding contact 363 is positioned so as to establish an output voltage, for $e_1 = 0$, of a magnitude corresponding to the value of the hyperbolic cosine function when $e_1 = 0$. FIGURE 43 illustrates the waveform 365 of the output voltage for variations in the input voltage between its upper and lower limits, such limits corresponding to the value of the function cosh $e_1 = \pm 3$.

The truncation error for the circuit of FIGURE 42 is approximately 0.7% at full scale input. To obtain greater accuracy, the function may be truncated at four terms, and the coefficients optimized in the normal manner. To develop a voltage corresponding to the sixth power of the input voltage, a varistor cubing network and squaring network may be connected in tandem to the output of the rectifier 347. In such case, the output of the varistor squaring unit is summed with the voltages picked off the various potentiometers as described in connection with FIGURE 42. It will be recognized, of course, that the settings of the sliding contacts of the various potentiometers are different in such arrangement, inasmuch as the optimized coefficients for the series function truncated at four terms are different from those for the series function truncated at three terms. The operation of a circuit thus arranged is 0.03% of full scale inputs corresponding to $\pm 3$.

Figure 44:
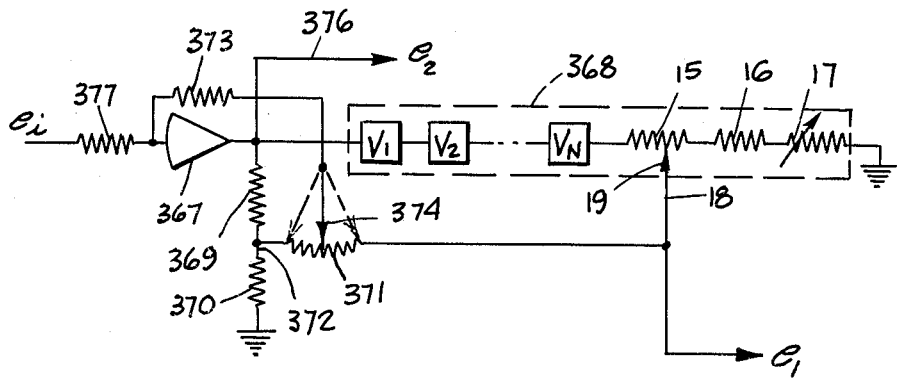
FIGURE 44 is a schematic diagram of a unique circuit means employing our function generator units for developing respective output voltages at two points that vary as roots and non-integral powers of the input voltage.

FIGURE 44 illustrates a unique circuit of our invention for generating output voltages selectively that represent any desired power of the input voltage between the one-half power and the second power. Such peculiar powers of a variable are often needed in making an analysis of the operation of a system, such as a gas generating system, wherein various functions are illustrated thermodynamically by plots of curves that vary at some peculiar power of the variable.

Referring to FIGURE 44, our "variable $n$" or "variable exponent" system comprises a computing amplifier 367 that has its output connected to a varistor squaring network unit 368. A pair of resistors 369, 370 are connected in series between the output of the amplifier 367 and ground, and a potentiometer 371 is connected between the junction 372 of the resistors 369, 370 and the output lead 18 of the squaring unit 368. A resistor 373 is connected between the input of the amplifier 367 and a sliding contact 374 on the potentiometer 371. An output connection 375 is provided at which, as indicated, output voltages $e_1$ appear. Also, an output connection is provided from the output of the amplifier 367, as indicated at 376, for output voltage $e_2$. As shown, input voltages $e_i$ are applied through an input resistor 377 to the amplifier 367.

In the circuit of FIGURE 44, the output voltage $e_1$ may vary as any power of the input voltage between the first and second powers, and the output voltage $e_2$ may vary as any fractional power of the input voltage between 0.5 and unity. Furthermore, when the output voltage $e_1$ is linear, the output voltage $e_2$ corresponds to the square root of the input; and when the output voltage $e_2$ is linear, the output voltage $e_1$ varies as the square of the input voltage.

To understand the operation of the circuit of FIGURE 44 to perform these functions, it is necessary to examine the operation in the situations wherein the sliding contact 374 is at the ends of the potentiometer 371. When the sliding contact 374 is at the end of the potentiometer nearest the junction 372 of the voltage divider resistors 369, 370, it will be seen that the feedback loop of the amplifier 367 includes only the resistors 369 and 373. Thus, in this position of the sliding contact 374, the amplifier 367 operates as a conventional linear amplifier, so that the output thereof, i.e., the voltage $e_2$, varies linearly with the input voltage $e_i$. Simultaneously, of course, the squaring unit 368 functions in the normal manner to provide an output voltage $e_1$ that varies as the square of the input voltage $e_i$.

Figures 45, 46:
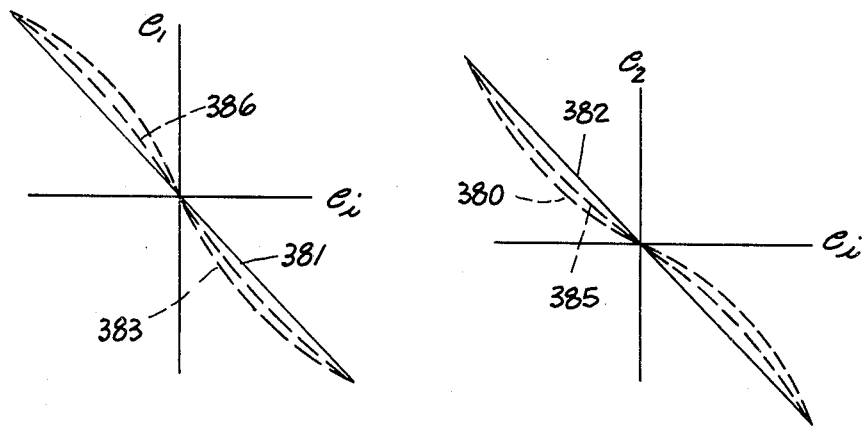
FIGURES 45 and 46 illustrate the waveforms of the output voltage versus the input voltage at the two points of the circuit of FIGURE 44, to show the variations of the voltages at the two points that can be effected.

This operation will be seen more clearly from the illustrations shown in FIGURES 45 and 46. In FIGURE 45, the dotted waveform 380 illustrates the variation in the output voltage $e_1$ in accordance with the square of the input voltage $e_i$. In FIGURE 46, the linear waveform 381 illustrates the linear relationship between the output voltage $e_2$ and the input voltage $e_i$.

When the sliding contact 374 is moved along the potentiometer 371 to the end thereof opposite the junction 372 of the resistors 369, 370, it will be seen that the squaring unit 368 is included in the feedback loop of the amplifier 367, i.e., the squaring unit 368 and the resistor 373 constitute the feedback path for the amplifier 367 in this position of the sliding contact 374. Thus, the feedback of the amplifier 367 includes a nonlinear resistance network. The amplifier 367 operates to change its gain in a direction opposite to voltage variations occasioned by the nonlinear network. Since the voltage fed back across the amplifier varies as the square of the input voltage to the squaring unit, the gain of the amplifier 367 is made to vary as the square root of the input voltage. The net result is that the output voltage $e_1$ is linear, as illustrated at 382 in FIGURE 45.

Considering further the situation where the sliding contact 374 is at the end of the potentiometer 371 remote from the junction 372, it will be apparent that the output volage $e_2$ varies directly in accordance with the gain of the amplifier 367; hence the output voltage $e_2$ varies as the square root of the input voltage $e_1$. In FIGURE 46, the dotted wavefrom 383 illustrates the square root variation of the output voltage $e_2$.

The extreme positions of the sliding contact 374 dictate the limits for the functions generated at both outputs. For the output voltage $e_1$, voltages are obtained that vary between a linear waveform (varying directly as the input voltage $e_1$) and a waveform of the square of the voltage $e_1$. The voltage $e_2$ varies from linear to the square root representation of the input voltage.

For any position of the sliding contact 374 intermediate the ends of the potentiometer 371, both of the output voltages $e_1$, $e_2$ are nonlinear and complementary, i.e., for any given position of the sliding contact 374, the waveform of the voltage $e_1$, as indicated at 385 in FIGURE 45, varies as some power of the input voltage between unity and 2.0. Correspondingly, the waveform of the output voltage $e_2$, as indicated at 386 in FIGURE 46, is a fractional power of the input voltage somewhere between unity and 0.5

Figure 47:
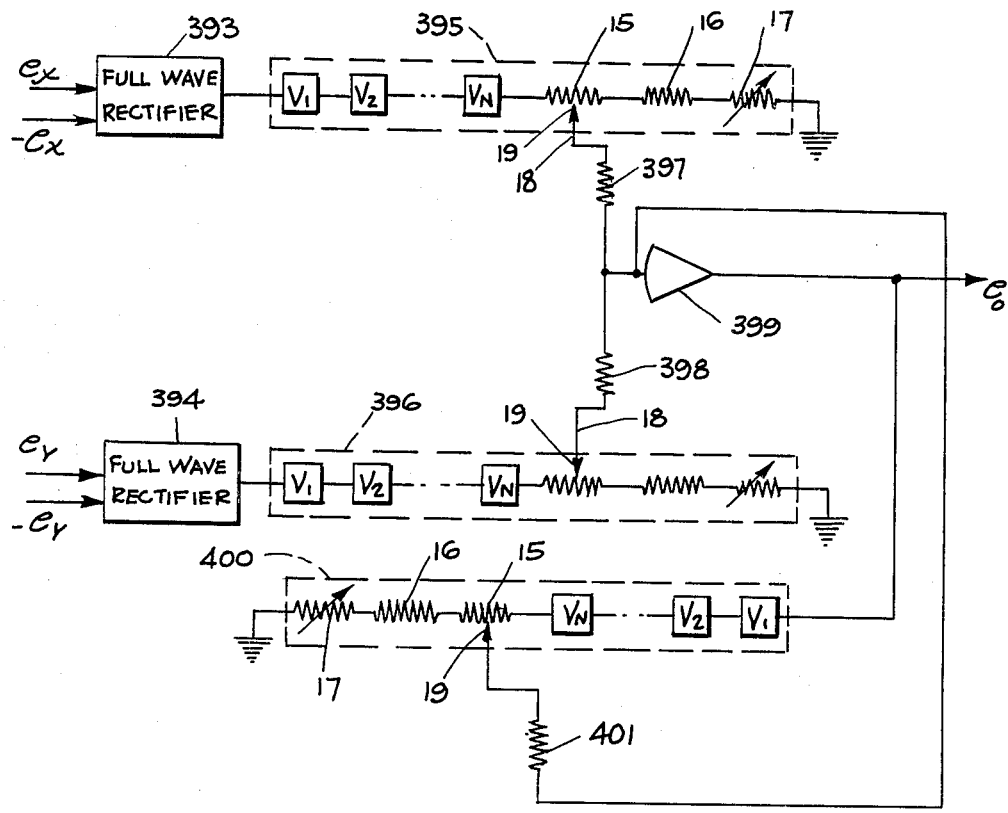
FIGURE 47 is a schematic diagram of our unique circuit using function-generating units to provide an output voltage that represents the vector sum of separate input voltages that represent mutually perpendicular vectors.

FIGURE 47 illustrates a unique circuit of our invention for developing an output voltage that corresponds to the sum of two mutually perpendicular vectors, wherein respective input voltages, $e_x$, $e_y$ represent the values of the vectors. For example, and referring to FIGURE 48, voltages $e_x$, $e_y$ may represent the lengths of the sides 390, 391 of a right triangle. Our invention provides an output voltage $e_0$ that represents the hypotenuse of the right triangle, designated at 392.

Referring to FIGURE 47, the absolute values of the voltages $e_x$, $e_y$ are obtained with respective full-wave rectifiers 393, 394 to which the positive and negative values of the voltages $e_x$, $e_y$ are applied. The outputs of the rectifiers 393, 394 are applied to respective varistor squaring network units 395, 396, which develop at their sliding contacts 19 voltages that vary as the square of the voltages $e_x$, $e_y$. The output leads 18 are coupled through respective resistors 397, 398 to the input of a computing amplifier 399.

The circuit of FIGURE 47 responds to the sum of the squares of the voltages $e_x$, $e_y$ to develop an output voltage that is the square root of the sum of the squares of these voltages. To this end, the amplifier 399 has a feedback network including a varistor squaring network unit 400. As shown, the output of the amplifier 399 is connected to the varistor $V_1$ of squaring unit 400 and the sliding contact 18 of such network is coupled through a resistor 401 to the input of the amplifier 399.

Figure 48:
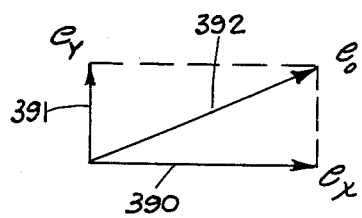
FIGURE 48 is a vector diagram to aid in explaining the operation of the circuit of FIGURE 47.

Inclusion of the squaring network unit 400 in the feedback path of the amplifier 399 causes the gain of such amplifier to vary so that its output voltage represents the square root of the voltage applied thereto. Therefore, since the voltage applied to the amplifier 399 is $e_x^2 + e_y^2$, the amplifier develops an output voltage $$e_0 = \sqrt{e_x^2 + e_y^2}$$

i.e., the hypotenuse 392 of FIGURE 48.

The circuit of FIGURE 47 is not limited to developing an output voltage corresponding to the resultant of a pair of input voltages representing mutually perpendicular vectors. For example, three separate voltages corresponding to vectors along three mutually perpendicular axes may also be applied to the amplifier 399. In such case, an additional rectifier and varistor squaring network are employed to apply to the input of the amplifier 399 a voltage corresponding to the square of the third voltage input.

From the foregoing, it will also be recognized that the circuit of FIGURE 47 can be expanded so as to include any desired number of varistor squaring networks for applying respective voltages to the input of the amplifier 399. Regardless of how many such networks are employed, the algebraic sum of the squares of all of them appear at the input of the amplifier 399. Accordingly, the output voltage in such case represents the square root of the sum of the squares of all such input voltages.

Figure 49:
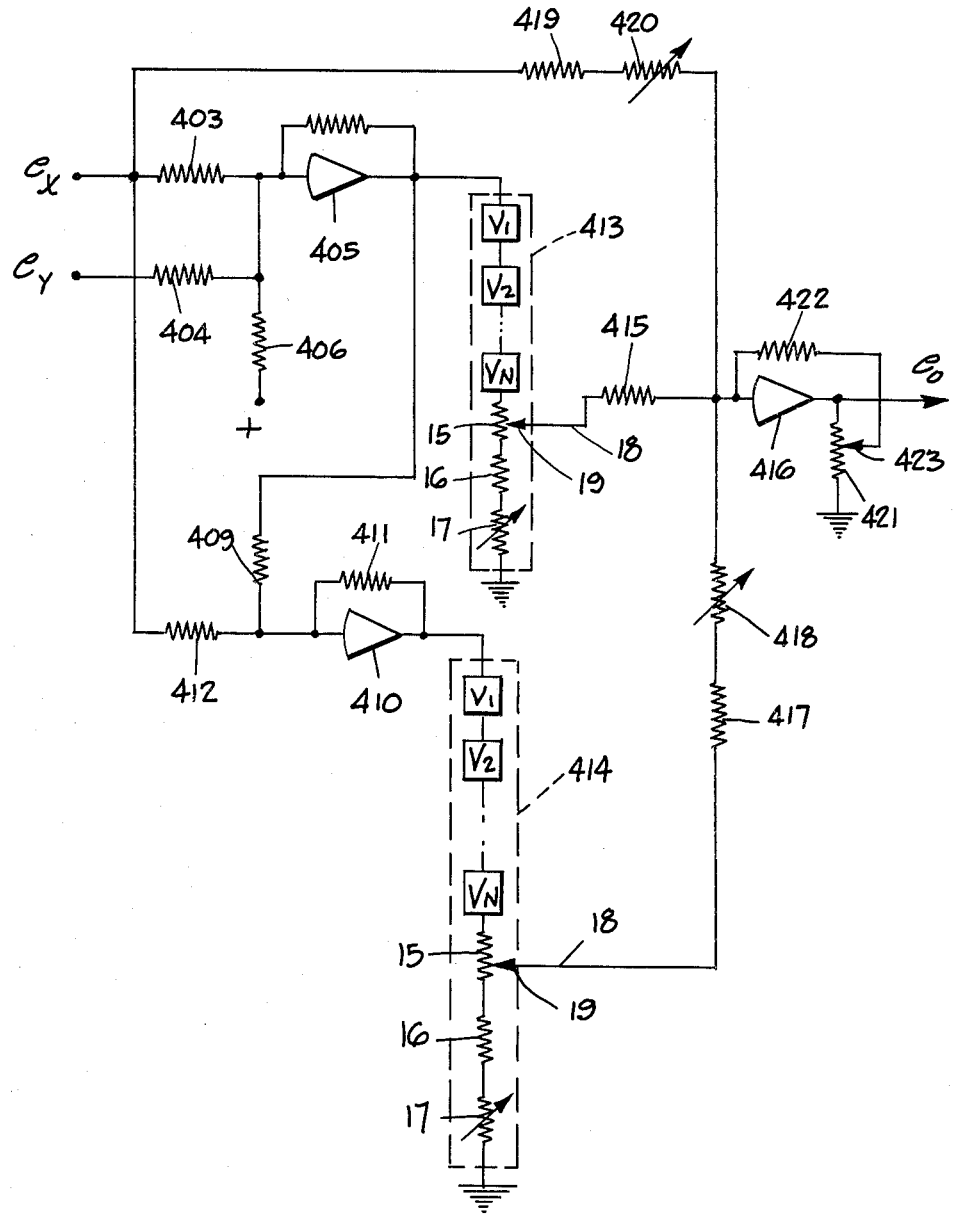
FIGURE 49 is a schematic diagram of a novel computer circuit employing varistor squaring networks for obtaining the product of a pair of quantities represented by respective input voltages.

FIGURE 49 illustrates a unique multiplication circuit of our invention, for obtaining the product of two input voltages $e_x$, $e_y$. This circuit operates in accordance with a unique variation in the well-known quarter-square identity which, for general case, is expressed as $$(x+y)^2 - (x-y)^2 = 4xy$$

How this is accomplished will be made more evident hereinafter in connection with the description of the operation of the circuit of FIGURE 49

In the circuit of FIGURE 49, the voltages $e_x$, $e_y$ for which the product is to be obtained are applied through respective resistors 403, 404 to the input of a computing amplifier 405, along with a constant voltage, $e_k$, fed through a resistor 406 connected to the input of the amplifier. As shown, the amplifier 405 has a feedback resistor 407 connected between its input and output. The output of the amplifier 405 is fed through a resistor 409 to the input of of another computing amplifier 410 that is also provided with a feedback resistor 411. As shown, one of the voltages, $e_x$, is applied to the input of the amplifier 410, as through a resistor 412.

Connected to the outputs of the amplifiers 405, 410 are respective varistor squaring network units 413, 414. The squaring unit 413 has its output coupled through a resistor 415 to the input of a computing amplifier 416. The output of the squaring unit 414 is coupled through fixed and variable resistors 417, 418 to the input of the amplifier 416. Also, a portion of the voltage $e_x$ is fed through fixed and variable resistors 419, 420.

As previously indicated, the circuit of FIGURE 49 is adapted to operate in accordance with a unique variation of the quarter-square identity. In this connection, our unique circuit operates in accordance with the following expression:

$$(x+y+k)^2 - (x-y-k)^2 - 4kx = 4xy$$

To obtain this relationship in the circuit of FIGURE 49, the voltages $e_x$, $e_y$, and the constant voltage $e_k$, are applied in the same polarity to the input of the amplifier 405. By virtue of the resistance values of the resistors 403, 404, 406, 407, the amplifier operates as a one-fourth gain amplifier. Thus, the output of the amplifier 405 is a voltage corresponding to $$-\frac{e_x + e_y + e_k}{4}$$

The minus sign in this expression arises because the amplifier 405 develops an output voltage that is opposite in polarity to the input voltage.

The amplifier 410 is adapted to operate as a unity-gain amplifier for the voltage in the output of the amplifier 405. Simultaneously, the amplifier 410 functions in response to the voltage $e_x$ as a half-gain amplifier. Thus, and keeping in mind that the amplifier 410 changes the polarity of the voltage applied thereto, the output of the amplifier 410 is:

$$\frac{e_x+e_y+e_k}{4}-\frac{e_x}{2}$$

which resolves into the quantity $$\frac{(e_x-e_y-e_k)}{4}$$

Since the varistor squaring networks 413, 414 operate to develop output voltages corresponding to the squares of the input voltages thereto, the unit 413 derives an output voltage proportional to $$-(x+y+k)^2$$

i.e.

$$-(e_x+e_y+e_k)^2$$

and the unit 414 develops an output voltage proportional to $$(x-y-k)^2$$

i.e.

$$(e_x-e_y-e_k)^2$$

Thus, the voltages developed by the squaring units 413, 414 correspond to $(x+y+k)^2$ and $(x-y-k)^2$, respectively. The summation of these voltages results in a voltage proportional to $4xy-4kx$. The term $-4kx$ in the modified quarter-square identity is removed by summing a term proportional to $+4kx$ by applying a portion of the voltage $e_x$ to the summing junction of the amplifier 416 through input resistors 419, 420. The resistor 420 is a variable resistor used to obtain the required magnitude of the voltage $e_x$ applied directly to the amplifier 416 for this purpose. Also, the resistor 418 is adjusted to ensure that the voltages from the units 413, 414 are applied to the amplifier 416 with the same gain factors.

As shown, the amplifier 416 has a potentiometer 421 connected to its output, and a feedback resistor 422 is connected between the input of the amplifier 416 and the sliding contact 423 of such potentiometer. The sliding contact 423 is positioned so that the output voltage $e_0$ is equal in magnitude to either of the voltages $e_x$, $e_y$ when such input voltages are at their maximum values.

The multiplication system of our invention has several unique advantages over multiplier networks heretofore known. One advantage resides in the high input impedance and low output impedance possible with out invention. For example, for 0.2 to 1.0 megohm resistors at the input, the system of our invention has an output impedance of less than 1.0 ohm.

The constant voltage utilized in our multiplier circuit provides other distinct advantages. One such advantage is due to the constant voltage being made high enough so that the sign of the quantity in the output of the amplifier 405 is always the same, regardless of the polarities and magnitudes of the voltages $e_x$, $e_y$. This eliminates the need for any diodes of amplifier circuit arrangements for obtaining voltages that represent the absolute values of the quantities to be squared, and results in the further advantage that our system functions as a four-quadrant multiplier. Considering the modified identity, if the input voltages are of the same polarity, i.e., the same sign, the first squared term is the larger one, and the output voltage is positive. If the input voltages are of opposite polarities, i.e., different in sign, the second squared term is the larger, and the output voltage is negative.

Figure 50:
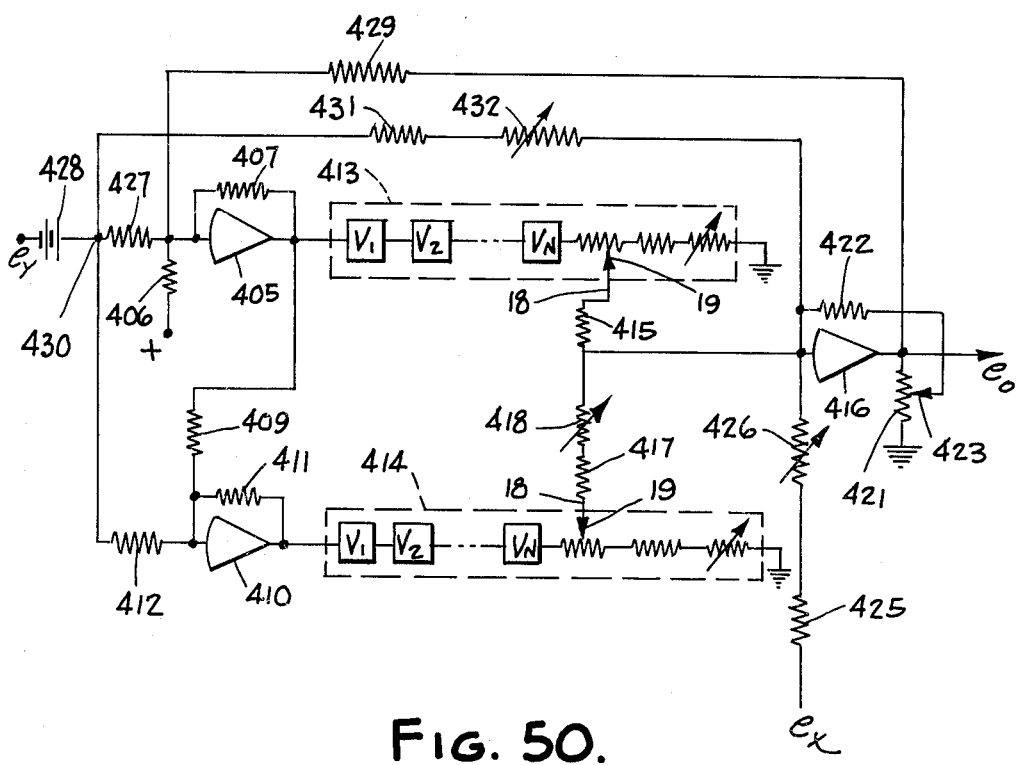
FIGURE 50 is a schematic diagram of a unique divider circuit employing squaring varistor networks, to develop a voltage representing the quotient of quantites represented by respective input voltages.

FIGURE 50 illustrates the unique circuit of our invention for obtaining the quotient of two input voltages, wherein division is effected by multiplication. To this end, a multiplier circuit is used, such as the multiplier circuit heretofore described in connection with FIGURE 49. Accordingly, the portions of the divider circuit of FIGURE 50 formed by a multiplier are numbered the same as in the multiplier circuit of FIGURE 49. The quotient of two input voltages $e_x$, $e_y$ is obtained by applying the voltage $e_x$ corresponding to the numerator directly to the input of the output amplifier 416, as through fixed and variable resistors 425, 426. The input resistor 427 for the amplifier 405 is connected to a source of constant voltage, indicated as a battery 428, which in turn is connected to the source of the voltage $e_y$ that corresponds to the denominator. Additionally, the output of the amplifier 416 is fed back through a resistor 429 to the input of the amplifier 405, and the junction 430 of the resistor 427 and the battery 428 is connected, through fixed and variable resistors 431, 432, to the input of the amplifier 416.

To understand how the circuit of FIGURE 50 operates as a divider, it should be pointed out that such circuit is designed to process voltages in accordance with the identity:

$$\frac{x}{y}=\frac{x}{y}(1-y)+x$$

Relating this identity to the quarter-square identity by which voltages are processed in the multiplier network of FIGURE 49, we have:

$$\left[\frac{x}{y}+(1-y)+k\right]^2-\left[\frac{x}{y}-(1-y)-k\right]^2-4k\frac{x}{y}+4x=4\frac{x}{y}$$

It will be noted that the quantity $x/y$ is what is sought for the output voltage $e_0$. The quantity $(1-y)$ is provided by the difference between the voltage $e_y$ and the voltage of the battery 428. In terms of the modified quarter-square identity, the voltage applied at the junction 430 of the resistor 427 and the battery 428 has the magnitude $(1-e_y)$ corresponding to the quantity $(1-y)$.

Since a constant voltage $e_k$ is applied to the amplifier 405 through the resistor 406, and since the output voltage $e_0$ is also applied to the input of the amplifier 405, it will be seen that the voltages $e_0$, $(1-e_y)$, and $e_k$ are summed at the input of the amplifier 405. The amplifiers 405, 410, and the squaring units 413, 414 operate in the same manner as in the circuit of FIGURE 49. Hence, the voltages in the outputs of the squaring units, i.e., the voltage applied to the input of the amplifier 416 from such squaring units, together with the voltage $(1-e_y)$ applied through the resistive network 431, 432 to the input of the amplifier 416, functions, as per the circuit of FIGURE 49, such that the output voltage corresponding thereto is represented by:

$$[e_0+(1-e_y)+k]^2-[e_0-(1-e_y)-k]^2-4ke_0$$

However, the voltage $e_x$ corresponding to the numerator is applied directly to the input of the amplifier 416, in such a manner that the resulting output voltage is expressed by:

$$[e_0+(1-e_y)+k]^2-[e_0-(1-e_y)-k]^2-4ke_0+4e_x$$

Examination of this last expression shows that it resolves into the quantity:

$$4e_0(1-e_y)+4e_x$$

Since $e_0=e_x/e_y$, substitution thereof results in the last-mentioned expression being:

$$4\frac{e_x}{e_y}(1-e_y)+4e_x$$

Comparing this with the general expression for the identity first mentioned in connection with the circuit of FIGURE 50, it is seen that the circuit of FIGURE 50 satisfactorily operates to provide an output voltage that varies with the quotient of the input voltages $e_x$, $e_y$.

FIGURE 51 illustrates still another circuit in accordance with our invention for obtaining the quotient of two input voltages $e_x$, $e_y$. Referring to FIGURE 51, the input voltages $e_x$, $e_y$ are applied through respective resistors 435, 436 to computing amplifiers 437, 438. The amplifiers 437, 438 are coupled to respective varistor squaring network units 439, 440, the outputs of which are connected through respective resistors 441, 442 to the inputs of the amplifiers 437, 438. Thus, the squaring units 439, 440 are connected in the feedback loops of the amplifiers 437, 438.

This arrangement results in the outputs of the squaring units changing the gains of the amplifiers so that the voltages developed thereby represent $\sqrt{e_x}$, $\sqrt{e_y}$. As shown, the outputs of the amplifiers 437, 438 are applied, as at 443, 444, to respective inputs of an analog divider 445. Since voltages $\sqrt{e_x}$, $\sqrt{e_y}$ are applied to the divider 445, the divider develops an output voltage $$\frac{\sqrt{e_x}}{\sqrt{e_y}} \quad \text{or} \quad \sqrt{\frac{e_x}{e_y}}$$

The significance of this arrangement will be apparent when it is considered that analog dividers are characterized by relatively small ratios of input voltages they can handle, e.g., 20:1. Our circuit, however, can provide voltages having a much greater ratio, but the ratio is compressed to fall within the range of the divider. For example, voltages having ratios of 400:1, as 100 volts versus 0.25 volt, are converted to voltages of 10 volts and 0.5 volt, i.e., the ratio 20:1. Complementary expansion is effected, after dividing, as follows:

The output of the divider 445 is applied to a varistor squaring network unit 446. Since the squaring unit 446 develops an output voltage that varies as the square of the input voltage, the voltage at the output lead 18 varies as $$\left(\sqrt{\frac{e_x}{e_y}}\right)^2 = \frac{e_x}{e_y}$$

Figure 52:
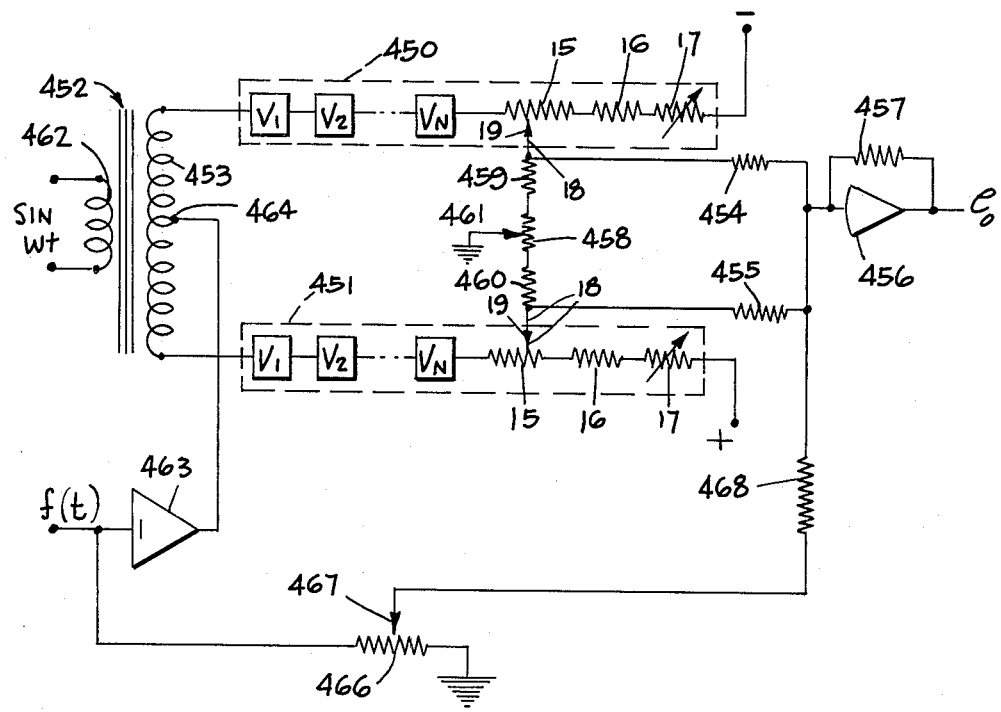
FIGURE 52 is a schematic diagram of a unique phase-sensitive modulator circuit employing function generator units in accordance with our invention.

FIGURE 52 illustrates a unique phase-sensitive modulator circuit of our invention that is particularly useful in simulation work where a phase-sensitive or controlled carrier modulator is required. Referring to FIGURE 52, a pair of varistor squaring network units 450, 451 are connected across the output of a transformer 452. As shown, each of the squaring units 450, 451 is connected to a respective terminal on the secondary winding 453 of the transformer 452. Also, the squaring units are connected at their opposite ends to respective terminals of a D.-C. voltage source. As shown, the output leads 18 of the squaring units are coupled through respective resistors 454, 455 to a computing amplifier 456 having resistive feedback illustrated by a resistor 457. The output leads 18 are also connected to a potentiometer 458, as through resistors 459, 460, such potentiometer having its sliding contact 461 connected to ground.

The voltage applied to the primary winding 462 of the transformer 452 is a sinusoidal voltage, sin $\omega t$, and is of a frequency corresponding to the frequency of a carrier that would, for example, be applied to the reference and control windings of a synchro device.

To determine the effects of modulation, a modulating input signal $f(t)$ is applied through a unity-gain amplifier 463 to the center-tap 464 of the secondary winding 464. Thus, if the modulating signal appears as a positive D.-C. voltage at the center-lap 464, then, since sinusoidal voltages at any instant applied to the squaring units are 180° out of phase, the input to one squaring unit is $$f(t) + \sin \omega t$$

and the input to the other squaring unit is $-f(t) - \sin \omega t$.

Since constant voltages of opposite polarity are also applied to the squaring units 450, 451, the outputs of such units represent the squares of the sum of the three voltages, i.e., the modulating signal, the carrier, and the constant voltage. Thus, if $k$ represents the constant voltage, then the output of one of the squaring units is a voltage corresponding to $$[f(t) + \sin \omega t + k]^2$$

and the output of the other squaring unit is a voltage corresponding to $$[f(t) - \sin \omega t - k]^2$$

These quantities will be recognized as corresponding to the first two terms in the identity $$(x+y+k)^2 - (x-y-k)^2 - 4kx = 4xy$$

Addition of a constant term corresponding to $-4kx$ is effected by applying a portion of the modulating signal $f(t)$ through a potentiometer 466 having its sliding contact 467 coupled, as through a resistor 468, to the input of the amplifier 456. Thus, the output voltage $$e_0 = k[f(t) \sin \omega t]$$

The circuit of FIGURE 52 is uniquealy adapted for processing signals wherein one signal is sinusoidal. It also has a distinct advantage over conventional phase-sensitive modulators in that, in such prior art modulators, clipping of the sinusoidal waveform creates unwanted high frequencies that must subsequently be removed by filtering. As is well known, such filtering effects a phase shift of the carrier, so that the range of accuracy is severely limited. For example, prior art phase-sensitive modulators are generally unreliable to process signals $f(t)$ that exceed 20 cycles per second. In the circuit of FIGURE 52, however, there is no deterioration of the sinusoidal waveform; hence, no filtering is needed. Accordingly, the phase-sensitive modulator of our invention is characterized by reliable operation over a frequency range, e.g., 40 cycles per second, in which prior art phase-sensitive modulators are ineffective.

Although we have described and illustrated different embodiments of varistor network units and networks including same, it will be apparent that various modifications can be made without departing from the spirit and scope of our invention. For example, our invention embraces varistor network units adapted to develop an output voltage that varies as any desired integral power or fractional power of an input voltage. It is also apparent that circuits in accordance with our invention may employ other devices than varistor network units in their operation. In this latter connection, our unique circuit means embrace the use of any devices capable of developing electrical characteristics of the desired nonlinear character, e.g., conventional function generators may, if desired, be employed in our novel circuits. Accordingly, we do not intend that our invention be limited, except as by the appended claims.

We claim:

1. A function device for enabling the production of a current flow which is proportional to a predetermined exponential of an input voltage with less than a predetermined percentage error, for input voltages of up to a predetermined maximum total voltage comprising:
    a plurality of a least four varistor elements connected in series, each element characterized by a capability, when connected in series with a linear resistor, of enabling current flow through said element which varies according to said predetermined exponential for voltages across the element and resistor of up to a particular partial voltage with less than approximately said predetermined percentage error, the sum of said partial voltages of said elements being approximately equal to said predetermined maximum total voltage.

2. A device for generating an output which varies according to the square of the input for input voltages of up to a maximum predetermined voltage comprising:
    a plurality of more than three varistor elements connected in series, each having a current flow which varies proportionately to a predetermined exponential of more than 2 of the voltage thereacross between zero voltage and a particular characteristic voltage for that particular element, the current flow varying at substantially lower exponentials than said predetermined exponential for voltage inputs of more than said particular characteristic voltage; and a substantially linear resistance connected in series with said plurality of elements for causing a current flow proportional to the square of the voltage across the combination of said plurality of elements and said resistance;

the total of said characteristic voltages of all of the varistor elements in said series connection being at least as great as the voltage across only said plurality of varistors which obtains when said maximum predetermined voltage is connected between the combination of said plurality of varistors and said substantially linear resistance.

3. A function network for producing a voltage output proportional to a predetermined exponential of an input voltage comprising:

a plurality of series connected varistor elements;

a substantially linear total resistance connected in series with said varistor elements;

each of said varistor elements characterized by a flow of current therethrough, if said element were connected in series with a particular partial resistance and a voltage were applied across the combination, such that said current would be proportional to said predetermined exponential of the voltage across the combination for voltages up to a particular partial voltage, the series equivalent resistance of said particular partial resistances for all of said elements being approximately equal to said substantially linear total resistance.

4. A function network as defined in claim 3 including: input voltage generating means for generating voltages across said function network of no more than the sum of said particular partial voltages of all of said varistor elements.

5. A function generating device comprising:

a multiplicity of series connected varistor elements having rectification characteristics, a first plurality of said elements oriented so that their rectification characteristics oppose current flow in a particular current flow direction, and a second plurality of said elements oriented so that their rectification characteristics oppose current flow in the reverse of said particular current flow direction, the total rectification capability of said first plurality of elements being approximately equal to the total rectification capability of said second plurality of elements, whereby to provide substantially origin symmetry voltage-current characteristics.

6. Nonlinear function generating means for enabling the production of an output voltage which is a predetermined non-linear function of an input voltage up to a predetermined maximum input voltage comprising:

a plurality of circuit means having non-linear current-voltage characteristics, and means conductively interconnecting said circuit means to form a network which, when connected to a substantially linear resistance, produces an output voltage according to said predetermined non-linear function with first additive errors for voltage inputs between a first fractional voltage and a second fractional voltage, subtractive errors for voltage inputs between said second fractional voltage and a third fractional voltage, and second additive errors for voltage inputs between said third fractional voltage and an input fourth voltage, the number of said circuit means in said function generating means being controlled to cause the greatest one of the maximum absolute values of said first additive, said subtractive and said second additive errors to be less than 50% greater than the smallest one of said maximum absolute values.

7. A nonlinear function generating means as defined in claim 6 wherein:

said first fractional voltage is approximately zero and said input fourth voltage is approximately equal to said predetermined maximum input voltage.

8. A nonlinear function generating means for enabling the production of an output voltage which is approximately an exponental of input voltage across it up to a predetermined maximum input voltage comprising:

a plurality of circuit means, each of said circuit means having a current flow approximately equal to an exponential of voltage thereacross, and means conductively interconnecting said circuit means to form a network which, when connected to a substantially linear resistance, produces an output voltage according to said exponential function with first additive errors for voltage inputs between a first fractional voltage and a second fractional voltage, subtractive errors for voltage inputs between said second fractional voltage and a third fractional voltage, and second additive errors for voltage inputs between said third fractional voltage and an input fourth voltage, the number of said circuit means in said function generating means being controlled to cause the greatest one of the maximum absolute values of said first additive, said subtractive and said second additive errors to be less than 100% greater than the smallest one of said maximum absolute values.

References Cited by the Examiner

UNITED STATES PATENTS

| | | | |
|---|---|---|---|
| 2,643,348 | 6/53 | De Boisblanc et al. | 235—197 |
| 2,666,576 | 1/54 | Hirsch | 235—193 |
| 2,683,766 | 7/54 | Cunningham | 317—101 |
| 2,691,724 | 10/54 | Hoffman | 317—101 |
| 2,698,134 | 12/54 | Agins | 235—193 |
| 2,890,832 | 6/59 | Stone | 235—197 |
| 2,942,182 | 6/60 | Kramer | 324—57 |
| 2,945,177 | 7/60 | Moren | 324—57 |
| 3,051,847 | 8/62 | Niemeyer | 307—88.5 |
| 3,051,873 | 8/62 | Jensen | 307—88.5 |
| 3,056,100 | 9/62 | Warner | 307—88.5 |
| 3,064,898 | 11/62 | Walker | 235—197 |

OTHER REFERENCES

"The Design of Function Generators Using Silicon Carbide Non-Linear Resistor." Pages 154–157, March 1958, Brown et al., Electronic Engineering.

"Nonlinear Transfer Functions with Thyrite," Kovach and Comley; IRE Transactions on Electronic Computers, June 1958, pp. 91–97. Page 47; November 1945 of Radio.

MALCOLM A. MORRISON, *Primary Examiner.*

ABRAHAM BERLIN, WALTER W. BURNS, Jr., *Examiners.*